United States Patent
Dorninger

(10) Patent No.: US 9,582,142 B2
(45) Date of Patent: Feb. 28, 2017

(54) SYSTEM AND METHOD FOR COLLABORATIVE COMPUTING

(75) Inventor: Markus Dorninger, Tulln (AT)

(73) Assignee: Office for Media and Arts International GmbH, Vienna (AT)

( * ) Notice: Subject to any disclaimer, the term of this patent is extended or adjusted under 35 U.S.C. 154(b) by 253 days.

(21) Appl. No.: 14/397,868

(22) PCT Filed: May 2, 2012

(86) PCT No.: PCT/EP2012/058054
§ 371 (c)(1),
(2), (4) Date: Oct. 30, 2014

(87) PCT Pub. No.: WO2013/164022
PCT Pub. Date: Nov. 7, 2013

(65) Prior Publication Data
US 2015/0089452 A1    Mar. 26, 2015

(51) Int. Cl.
*G06F 3/048*  (2013.01)
*G06F 3/0481*  (2013.01)
*G06Q 10/10*  (2012.01)
*G06F 3/0488*  (2013.01)

(52) U.S. Cl.
CPC ......... *G06F 3/04815* (2013.01); *G06F 3/0488* (2013.01); *G06Q 10/101* (2013.01)

(58) Field of Classification Search
CPC  G06F 19/322; G06F 21/6218; G06F 3/04815; G06F 3/0488
USPC ........................................................ 715/844
See application file for complete search history.

(56) References Cited

U.S. PATENT DOCUMENTS

2006/0149567 A1* 7/2006 Muller ................ G06F 21/6218
                                                                 705/1.1
2012/0041783 A1* 2/2012 McKee ................ G06F 19/322
                                                                 705/3

FOREIGN PATENT DOCUMENTS

EP        2184670 A1    5/2010

OTHER PUBLICATIONS

International Search Report issued in International (PCT) Patent Application No. PCT/EP2012/058054 (Jul. 19, 2012).
(Continued)

*Primary Examiner* — Andrey Belousov
(74) *Attorney, Agent, or Firm* — Reising Ethington P.C.

(57) ABSTRACT

A system for facilitating collaborative visual expression on a portable computing device comprises a virtual workspace module constructing a virtual workspace at the portable computing device, the virtual workspace configured to host objects including one or more objects defining one or more subspaces of the virtual workspace. A synchronization module communicates with a cooperating computing device via a wireless communication link to synchronize the virtual workspace with another virtual workspace constructed at the cooperating computing device. A graphical user interface module generates a graphical user interface that presents an individual view of the virtual workspace to a user of the portable computing device and allows visual expression within the virtual workspace via a touch input device associated with the portable computing device. A touch input data processing module processes data pertaining to touch input detected by the touch input device in connection with the graphical user interface.

26 Claims, 17 Drawing Sheets

(56) References Cited

OTHER PUBLICATIONS

Written Opinion issued in International (PCT) Patent Application No. PCT/EP2012/058054 (Jul. 19, 2012).

* cited by examiner

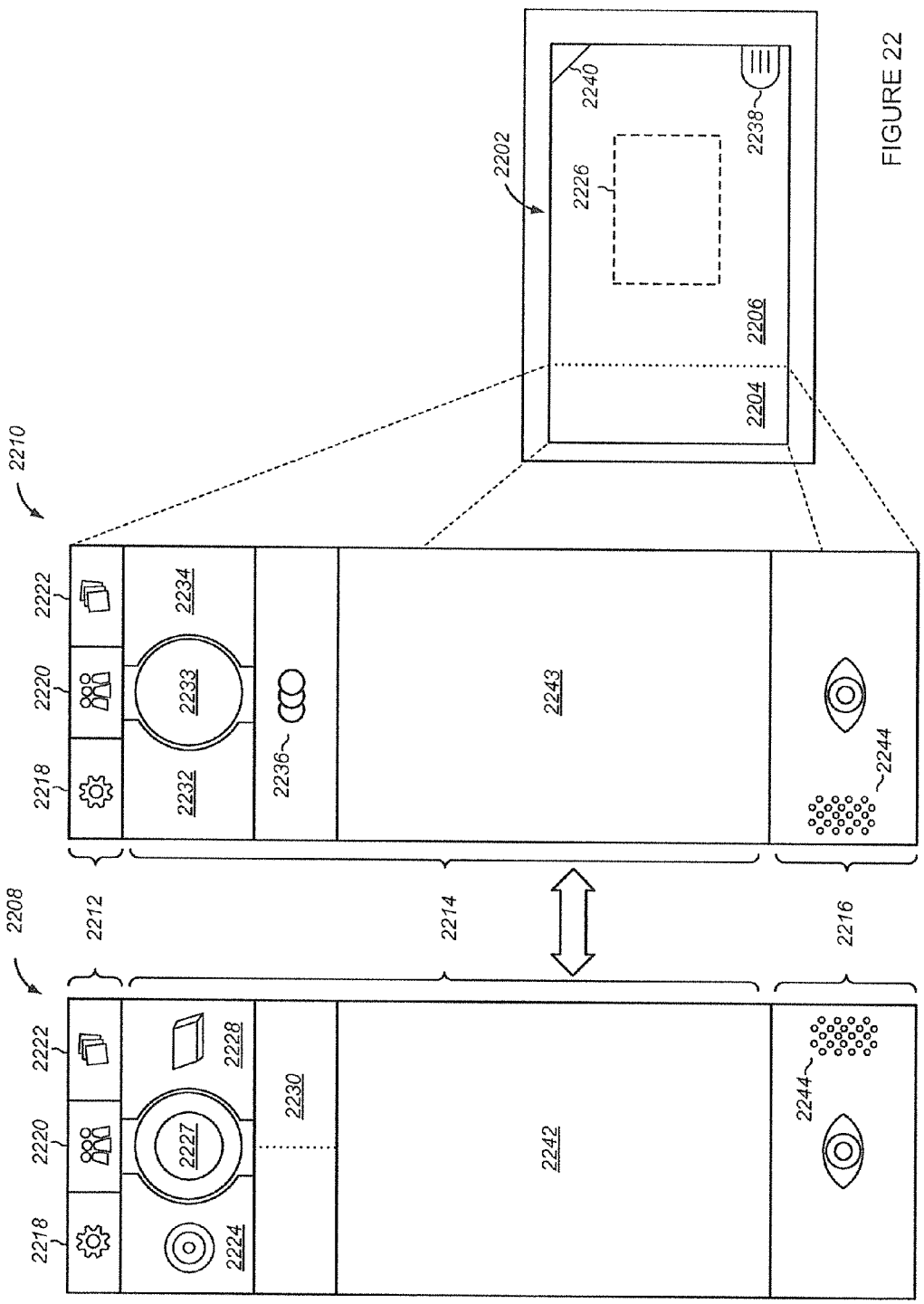

SYSTEM AND METHOD FOR COLLABORATIVE COMPUTING

This application is the national stage application of, and claims priority to, International Application No. PCT/EP2012/058054 filed May 2, 2012, the entire disclosure of which is incorporated herein by reference.

FIELD

The present disclosure relates generally to collaborative computing, in particular but not exclusively, for collaborative visual expression using portable computing devices supporting touch input.

BACKGROUND

Many kinds of artists work in groups as a matter of course, including musicians, actors and dancers. In contrast, visual artists often work independently. The advent of computer technology presents new opportunities for interaction and collaboration between visual artists.

Existing apparatus for collaborative artistic presentations include the "D.I.Y. Tagtool" system, one example of which is described in the reference entitled "D.I.Y Tagtool Mini" (http://www.tagtool.org/public_resources/Tagtool-_Mini_DIY_Guide.pdf), which is hereby incorporated by reference as if set out in full. The apparatus includes a computer connected to a graphics tablet, a gamepad, a controller and a projector. The apparatus is operated by two users: an illustrator and an animator. The illustrator draws graphical objects using the controller and graphics tablet. A pushbutton on the controller is used for "releasing" the graphical objects so that the animator can then move them around using the gamepad. However, this set-up limits the artistic freedom of the users—each user is limited to one "role", while the use of the gamepad for animation is cumbersome and lacks intuitiveness and ease of use.

Two Tagtool apparatuses can be used in combination, thereby enabling two sets of illustrators and animators to work together. For example, the two apparatuses can be connected to respective projectors with overlaying beams. Alternatively, a video mixer can be utilised to combine the output from the two apparatuses for projection by one projector, i.e. to blend graphics and frames from video using, for example, alpha blending, and chroma and luma keying. However, in these arrangements the illustrator/animator of one apparatus cannot manipulate the content created by the illustrator/animator of the other apparatus. Also, overlaying video signal from separate devices in high quality is an expensive, limited and complicated process.

Methods and systems are needed that improve the interactive and collaborative process.

SUMMARY

According to an embodiment of an aspect of the invention there is provided a system for facilitating collaborative visual expression on a portable computing device, the system comprising a virtual workspace module configured to construct a virtual workspace at the portable computing device, the virtual workspace configured to host objects including one or more presentation space objects; a synchronization module configured to communicate with a cooperating computing device via a wireless communication link, once established between the portable computing device and the cooperating computing device, in order to synchronize the virtual workspace at the portable computing device with another virtual workspace constructed at the cooperating computing device; a graphical user interface module configured to generate a graphical user interface, the graphical user interface configured to present an individual view of the virtual workspace to a user of the portable computing device and to allow visual expression within the virtual workspace via a touch input device associated with the portable computing device; a touch input data processing module configured to process data pertaining to touch input detected by the touch input device in connection with the graphical user interface; and an output module configured to output data pertaining to a current visual appearance of one or more content objects that at least partially overlap with at least one of the presentation space objects, to enable displaying of at least part of the content object or objects in a vicinity of the portable computing device.

The system enables collaboration between computing device users, and provides for an immersive visual experience for both the collaborating users and any watching audience, who may view the results of the collaboration live.

The graphical user interface may support different user roles. Broadly speaking, a user role defines a set of operations that can be performed in respect of objects by the user of the portable computing device. In one embodiment, the graphical user interface module is configured to support at least two user roles including a first user role for creating objects and a second user role for managing objects, and to allow the user to switch between user roles by touch input.

In one embodiment, the second user role enables the user to select one or more objects, which thereby become unavailable for selection by other users, and to designate at least one of the selected objects as an active object which can be transformed or manipulated. This provides a simple contention and management mechanism.

In one embodiment, the graphical user interface module is further configured to enable the user to perform one or more of the following: to activate and subsequently transform or manipulate an available object independently of other objects when there are no selected objects, by touch input within an area defined by a graphical representation of said available object; to activate and subsequently transform or manipulate a selected object independently of other objects, by touch input within an area defined by a graphical representation of said selected object; and to collectively activate and subsequently transform or manipulate selected objects, by touch input outside of areas defined by the graphical representation or representations of the selected objects. This allows the user to "directly" transform or manipulate objects individually and/or "indirectly" transform or manipulate objects collectively.

In one embodiment, the first user role comprises a painting role and the second user role comprises an animation role. In this way, each user may be a painter and an animator. The painting role allows the user to paint objects using touch input, while the animation role allows the user to apply animation to objects using touch input.

In one embodiment, when supporting the painting role, the graphical user interface is further configured to provide a first area in which the user can paint using touch input and to provide a second area in which the user can simultaneously change paint properties using another touch input. As such, the user can dynamically change paint properties such as colour attributes, e.g. hue, saturation, and value, with one hand, without having to interrupt the painting process being carried out using the other hand.

In one embodiment, when supporting the animation role, the graphical user interface is further configured to enable recording of a sequence of transformations applied to an object using touch input, said sequence of transformations defining an animation loop. The properties of the animation loop, such as its animation speed, may be adjusted. Furthermore, animation loops may automatically be closed so that a start position corresponds to an end position.

In one embodiment, a given object belongs to one of two or more user selectable subsets of objects, wherein the graphical user interface is further configured to provide user access to only one of the subsets of objects at a time, and wherein at least some of the objects are transferable between the two or more subsets. Organizing objects in this way can help prevent unintentional selection and manipulation of objects. It also allows the objects to be better managed, and in some cases objects can be tied to a presentation space.

In one embodiment, objects can be positioned within a range of depths in the virtual workspace, and wherein objects of at least one of the two or more subsets can be positioned above and/or below away than other objects in the virtual workspace at minimum and/or maximum depths respectively. Thus, visual objects can be used as backgrounds and masks.

In one embodiment, at least some of the objects are automatically associated with one or more of the user selectable subsets, and cannot be transferred to another subset. For example, a presentation space may be treated as an object that can be associated with a particular subset of objects.

The position, size and/or shape of presentation spaces may be adjusted to suit a particular display surface. In one embodiment, the graphical user interface enables the user to adjust said at least one of the presentation space objects by touch input, in order to compensate for perceived distortion caused by projection onto a surface that is not perpendicular to a projection axis, and to display a normal representation of said at least one of the presentation space objects to the user, and wherein the touch input data processing module is further configured to map touch inputs from the normal representation to the corresponding adjusted presentation space object.

In one embodiment, the touch input data processing module is further configured to identify a first touch input as a selection of an edge or corner of said at least one of the presentation space objects, to identify a second touch input as an adjusted position of the selected edge or corner, and to adjust said at least one of the presentation space objects in accordance with the touch inputs. This is an intuitive way of adjusting the presentation space.

Any appropriate number of presentation space objects may be provided in the shared virtual workspace, for example one presentation space for all of the participants, one presentation space object for each participant, or anything in between. In one embodiment, the virtual workspace comprises a plurality of presentation space objects at least two of which can be joined together to form an enlarged presentation space object.

In one embodiment, the graphical user interface module is further configured to apply visual effects to objects in order to indicate different states of the objects. This allows users to readily visualise the objects. For example, in one embodiment, the visual effects indicate one or more of: that an object has been selected by the user of the portable computing device or another user, that an object has been designated as an active object which can be transformed or manipulated, that an object is available for selection, that an object is unavailable for selection, and that an object belongs to one of two or more user selectable subsets of objects other than the one currently selected by the user.

In one embodiment, the system further comprises a graphics module configured to receive data describing one or more segments of one or more stroke gestures; generate vector data for the or each stroke segment; process the generated vector data for the or each stroke segment; output the processed vector data for display of a vector image representation of the or each stroke segment at the portable computing device; generate raster data for the or each stroke segment using the vector data; and output the raster data for display of a raster image representation of the or each stroke segment at the portable computing device display instead of the vector image representation.

In one embodiment, the received data comprises first time-stamped data describing a first segment of a first stroke gesture detected at the touch input device associated with the portable computing device and second time-stamped data describing a second segment of a second stroke gesture and received from the collaborating computing device, the graphics module further configured to sort the display order of the vector image representations of the first and second segments according to the time stamps before the raster data is output for display.

In one embodiment, the shared virtual workspace is divided into a plurality of texture tiles, and wherein the graphics module is further configured to write the raster data to one or more the textures tiles corresponding to locations of the one or more stroke gestures.

According to an embodiment of another aspect of the invention there is provided a computer-implemented method for collaborative visual expression, the method comprising constructing a virtual workspace at the portable computing device, the virtual workspace configured to host objects including one or more presentation space objects; communicating with a cooperating computing device via a wireless communication link, once established between the portable computing device and the cooperating computing device, in order to synchronize the virtual workspace at the portable computing device with another virtual workspace constructed at the cooperating computing device; generating a graphical user interface, the graphical user interface configured to present an individual view of the virtual workspace to a user of the portable computing device and allowing visual expression within the virtual workspace via a touch input device associated with the portable computing device; processing data pertaining to touch input detected by the touch input device in connection with the graphical user interface; and outputting data pertaining to a current visual appearance of one or more content objects that at least overlap with at least one of the presentation spaces, to enable displaying of at least part of the objects or objects in a vicinity of the portable computing device.

In one embodiment, the method further comprises providing support for at least two user roles including a first user role for creating objects and a second user role for managing objects.

In one embodiment, the method further comprises, while supporting the second user role: receiving data pertaining to touch input indicating selection of one or more objects; preventing selection of said one or more objects by other users; and receiving data pertaining to touch input indicating designation of at least one of the selected objects as an active object which can be transformed or manipulated.

In one embodiment, the method further comprises one or more of activating and subsequently transforming or manipulating an available object independently of other objects when there are no selected objects, in response to touch input within an area defined by a graphical representation of said available object; activating and subsequently transforming or manipulating a selected object independently of other objects, in response to touch input within an area defined by a graphical representation of said selected object; and collectively activating and subsequently transforming or manipulating selected objects, in response to touch input outside of areas defined by the graphical representation or representations of the selected objects.

In one embodiment, the first user role comprises a painting role and the second user role comprises an animation role.

In one embodiment, the method further comprises, when supporting the painting role, receiving data pertaining to touch input representing a paint stroke in a first area of the graphical user interface; and receiving data pertaining to touch input indicating a paint property change in a second area of the graphical user interface, the touch inputs being simultaneous.

In one embodiment, the method further comprises, when supporting the animation role: recording a sequence of transformations applied to an object using touch input, said sequence of transformations defining an animation loop.

In one embodiment, a given visual object belongs to one of two or more user selectable subsets of objects, and the method further comprises providing user access to only one of the subsets of objects at a time, and wherein certain types of objects are transferable between the two or more subsets.

In one embodiment, the method further comprises hosting objects within a range of depths in the virtual workspace; and hosting objects of at least one of the two or more subsets in positions above and/or below other objects in the virtual workspace at minimum and/or maximum depths respectively.

In one embodiment, the method further comprises: automatically associating at least some of the objects with one or more of the user selectable subsets; and preventing said objects from being transferred to another subset.

In one embodiment, the method further comprises adjusting said at least one of the presentation space objects in response to touch input; displaying a normal representation of said at least one of the presentation space objects to the user; and mapping touch inputs from the normal representation to the corresponding adjusted presentation space object.

In one embodiment, the adjusting comprises interpreting data pertaining to touch input as a selection of an edge or corner of said at least one of the presentation space objects; and interpreting data pertaining to subsequent touch input as an adjusted position of the selected edge or corner.

In one embodiment, the method further comprises joining together at least two presentation space objects to form an enlarged presentation space object.

In one embodiment, the method further comprises applying visual effects to objects in order to indicate different states of the objects.

In one embodiment, the method further comprises at least one of: applying a first visual effect indicating that an object has been selected by the user or another user of the portable computing device, applying a second visual effect indicating that an object has been designated as an active object which can be transformed or manipulated, applying a third visual effect indicating that an object is available for selection, applying a fourth visual effect indicating that an object is unavailable for selection, and applying a fifth visual effect indicating that an object belongs to one of two or more user selectable subsets of visual objects other than the one currently selected by the user.

In one embodiment, the method further comprises receiving data describing one or more segments of one or more stroke gestures; generating vector data for the or each stroke segment; processing the generated vector data for the or each stroke segment; outputting the processed vector data for display of a vector image representation of the or each stroke segment at the portable computing device; generating raster data for the or each stroke segment using the vector data; and outputting the raster data for display of a raster image representation of the or each stroke segment at the portable computing device display instead of the vector image representation.

In one embodiment, the received data comprises first time-stamped data describing a first segment of a first stroke gesture detected at the touch input device associated with the portable computing device and second time-stamped data describing a second segment of a second stroke gesture and received from the collaborating computing device, the method further comprising sorting the display order of the vector image representations of the first and second segments according to the time stamps before outputting the raster data for display.

In one embodiment, the method further comprises dividing the shared virtual workspace into a plurality of texture tiles; and writing the raster data to one or more of textures tiles corresponding to locations of the one or more stroke gestures.

According to an embodiment of another aspect of the invention there is provided a system for facilitating collaborative visual expression on a portable computing device, the system comprising virtual workspace means for constructing a virtual workspace at the portable computing device, the virtual workspace configured to host objects including one or more presentation space objects; synchronization means for communicating with a cooperating computing device via a wireless communication link, once established between the portable computing device and the cooperating computing device, in order to synchronize the virtual workspace at the portable computing device with another virtual workspace constructed at the cooperating computing device; graphical user interface means for generating a graphical user interface, the graphical user interface configured to present an individual view of the virtual workspace to a user of the portable computing device and to enable visual expression within the virtual workspace via a touch input device associated with the portable computing device; touch input data processing means for processing data pertaining to touch input detected by the touch input device in connection with the graphical user interface; and output means for outputting data pertaining to a current visual appearance of one or more content objects that at least partially overlap with at least one of the presentation space objects, to enable displaying of at least part of the content object or objects in a vicinity of the portable computing device.

According to an embodiment of another aspect of the invention there is provided a portable computing device including the aforementioned system.

According to an embodiment of another aspect of the invention there is provided a computer network comprising a plurality of computing devices at least one of which is in accordance with the aforementioned portable computing device.

Features and preferable features of any and all of the above aspects may be combined in any way, unless the features combined are evidently alternatives or mutually incompatible in another way. Thus in the appended claim set, the claims may be combined in any combination. Any claim may depend on any other preceding claim or claims.

While embodiments are described in terms of systems, devices, or methods, the reader will appreciate that it may be suitable to provide embodiments in the form of a computer program. Such a program may comprise a set of computer executable instructions, to cause a computer to become configured as apparatus in accordance with an embodiment of an aspect of the invention, or to perform a method in accordance with another embodiment of an aspect of the invention. Such a computer program might be provided in the form of a suitable storage medium, such as an optical disk, or readable memory (e.g. FLASH memory) or by way of a signal, such as a download from a remote server, accessed for instance by means of the internet. Thus, any of the 'means' defined above can be implemented as code modules in any combination in a computer. The exact nature of computer program products inevitably develops over time, and the reader will understand that this development should not in any way inhibit the scope of protection conferred by this disclosure.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present embodiments and, together with the description, further serve to explain the principles of the embodiments and to enable a person skilled in the pertinent art to make and use the invention.

FIG. 22 schematically shows a graphical user interface, in accordance with an embodiment.

DETAILED DESCRIPTION OF THE EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

I. Overview of Collaborative Computing

Figure 1:
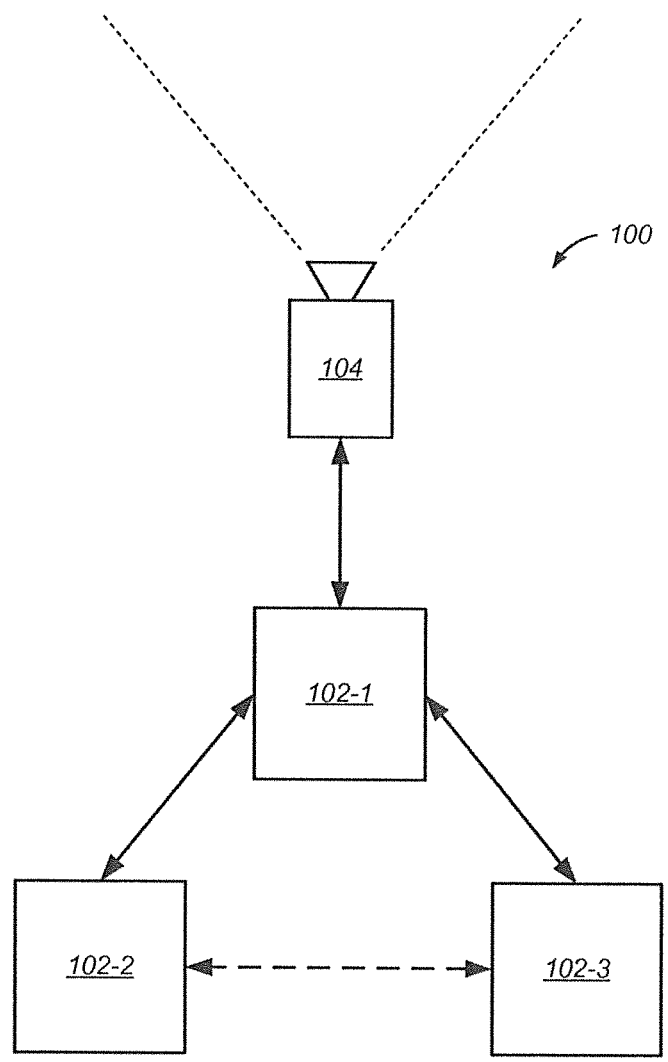
FIG. 1 is a schematic diagram of a computer network including a plurality of collaborating computing devices, in accordance with an embodiment.

FIG. 1 schematically shows a computer network 100 comprising a plurality (here, three) of computing devices 102-1, 102-2, 102-3 and a display device 104. As illustrated, computing device 102-1 is in wireless communication with computing devices 102-2, 102-3. Computing devices 102-2, 102-3 may also be in direct wireless communication with each other, or may communicate indirectly via computing device 102-1. At least computing device 102-1 is in wireless communication with display device 104, which displays visual information in the vicinity of computing device 102-1. In this context, the vicinity refers to a local area, e.g. relative to computing device 102-1. In some cases, the local area may be determined based on a particular technology used to establish communications. In other cases, the local area may be based on physical properties, such as structures defining an indoor space (e.g., walls of a room) and/or structures defining an outdoor space (e.g., buildings). It is to be understood that computing devices 102-2, 102-3 may be remote from computing device 102-1. In some embodiments, computing devices 102-2, 102-3 may be in wireless communication with the display device 104 and/or with other display devices (not shown). In some embodiments, the display device 104 may be connected by cable to computing device 102-1 through an I/O port. In other embodiments, the display device 104 may be integrated with computing device 102-1.

In embodiments, the wireless communications can include standard or non-standard communications. Some examples of standard wireless communications include, but are not limited to, Bluetooth, IEEE 802.11 (wireless LANs) Wi-Fi, 802.15 (WPANs), 802.16 (WiMAX), cellular protocols including, but not limited to, CDMA and GSM, ZigBee, and ultra-wideband (UWB) technologies. Some of these protocols support radio frequency communications while others support infrared communications. It is possible that other forms of wireless communications can be used such as ultrasonic, optical, and others. It is understood that the standards which can be used include past and present standards. It is also contemplated that future versions of these standards and new future standards may be employed.

In embodiments, computing devices 102-1, 102-2, 102-3 comprise portable computing devices. Some examples of portable devices include, but are not limited to, pad or tablet computers (e.g., iPad devices), laptop computers, personal digital assistants (PDAs), smart phones, or other devices easily carried by a user as known to those of skill in the art.

In embodiments, the display device 104 comprises a projector. Some examples of projectors include, but are not limited to, holographic laser projector, a liquid crystal display (LCD) projector, a liquid crystal on silicon (LCOS) projector, or a light emitting diode (LED) projector, among others. Other types of display devices, such as TVs and computer monitors, are also contemplated.

II. Computing Device

Figure 2:
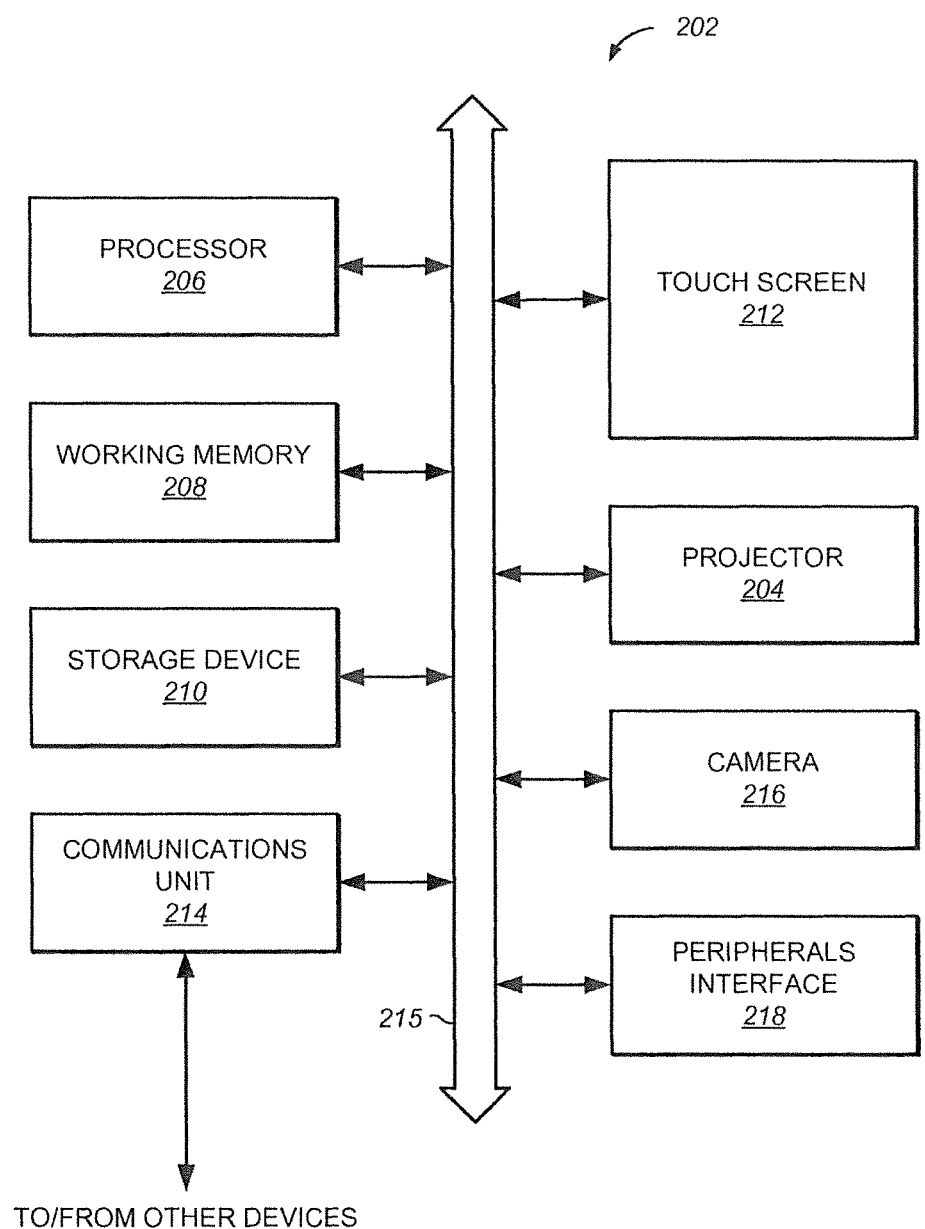
FIG. 2 is a block diagram of a computing device, in accordance with an embodiment.

FIG. 2 is a block diagram of a computing device, such as computing device 102-1, in accordance with an embodiment. The computing device 202 comprises a processor 206 connected to a working memory 208 by means of a bus 215, which in this context includes any mechanism for letting the various components of the computing device 202 communicate with each other as necessary. Examples of processors include general-purpose CPUs executing specialized software, stream processors (e.g. DSPs or general-purpose programmable GPUs), or specialized chips (e.g., FPGAs, ASICs and the like). Further, available computing resources can be heterogeneous, i.e., a mixture of different types of specialized computing resources (CPU, GPU, FPGA, reconfigurable FPGA, special purpose ASIC and the like). Some examples of processors include members of the Intel processor family, Motorola and IBM PowerPC processor families, as well as AMD, MIPS, and ARM processor families. Other types and examples of processors will be apparent to the skilled person.

Storage device 210 comprises a machine-readable medium configured to store one or more sets of instructions and data structures embodying or used by any one or more of the methodologies or functions described herein. The instructions may also reside, completely or at least partially, within the working memory 208 or within the processor 206 during execution thereof by the computing device 202. As will be generally understood, the computing device 202 may use the working memory 208 and the storage device 210 substantially interchangeably, the storage device 210 offering relatively large additional memory resources for the execution of computer programs. This is known as 'virtual memory' as will be understood by the reader. Thus, the software elements of the present embodiment may exist, at any point in time, either in the working memory 208 or in the storage device 210, or a portion in both, depending on the memory capabilities and processing characteristics of the particular implementation of the computing device 202. Some examples of machine-readable media may include semiconductor memory devices such as read-only memory (ROM), random-access memory (RAM), dynamic RAM (DRAM), double DRAM (DDRAM), static RAM (SRAM), programmable ROM, erasable programmable ROM (EPROM), electronically erasable programmable ROM (EEPROM), dynamic RAM, magnetic disks such as a floppy disk or hard drive, optical disks such as CD-ROM or DVD, magnetic tape such as Digital Video (DV) tapes, and any other media suitable for storing analog or digital information. Furthermore, such information may be transmitted or received over a communications network using a transmission medium via the communications unit 214 device and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks).

A man-machine interface is embodied as a touch screen 212. In general terms, a touch screen comprises a touch pad that operates in conjunction with a display panel over which the touch pad is accurately registered. Thus, a touch screen generally refers to an electronic visual display that can detect the presence and location of a single touch (or multiple touches) within its display area. Touch screens may detect touches using any technology known in the art including, but not limited to, resistive, capacitive, infrared, surface acoustic wave, strain gauge, optical imaging, acoustic pulse recognition, frustrated total internal reflection, and diffused laser imaging technologies, to name just a few. A separate input device may be provided in addition to, in combination with, or in place of the touch screen 212. Such input devices may be integrated with or separate from the computing device. For example, the input device may comprise a graphics tablet, such as one available from Wacom.

Broadly speaking, a touch (or touch input) refers to contact with, or proximity to (i.e., in detection range without making physical contact), a touch input device. A touch can be imparted by means of, for example, a users hand(s), finger(s), and/or by means of a stylus or other instrument. A touch can be a tap, stroke, slide, swipe, pinch, release, hold, or any other kind of actions including multiple actions of one or more of the aforementioned types. A touch characterized by multiple feature points (e.g. beginning and end points of a stroke) is also commonly referred to as a gesture. Touch input devices can generally detect a touch and its location, i.e. that a touch has been imparted, and where. However, they may also detect the angle of approach of the touch, the size of the area being touched, the degree of contact, i.e. "pressure", and so on.

The communications unit 214 is operable to establish communications links with other computing devices, under control of the processor 206. As noted earlier, the communications unit 214 may utilise wireless communications protocols. The communications unit 214 may also allow connection to one or more networks such as the Internet. Thus, the computer device may also include software that enables communications over a network, such as the HTTP, TCP/IP, RTP/RTSP protocols, and the like.

The computing device 202 in the illustrated embodiment also includes a video camera 216 for capturing picture and/or video data, and a projector 204, such as a pico-projector. In some embodiments, either or both of the video camera and/or a projector are external devices that can be connected to the computing device 202 by means of peripherals interface 218 or communications unit 214.

It will be readily apparent to one of ordinary skill in the art that many other hardware and software configurations are suitable. For example, the computing device 202 may have audio input/output capability, as well as other input interfaces such as a keyboard and pointing device (e.g., a mouse), accelerometer, microphone, location sensor (e.g. GPS-based), and so on.

III. System

Figure 3:
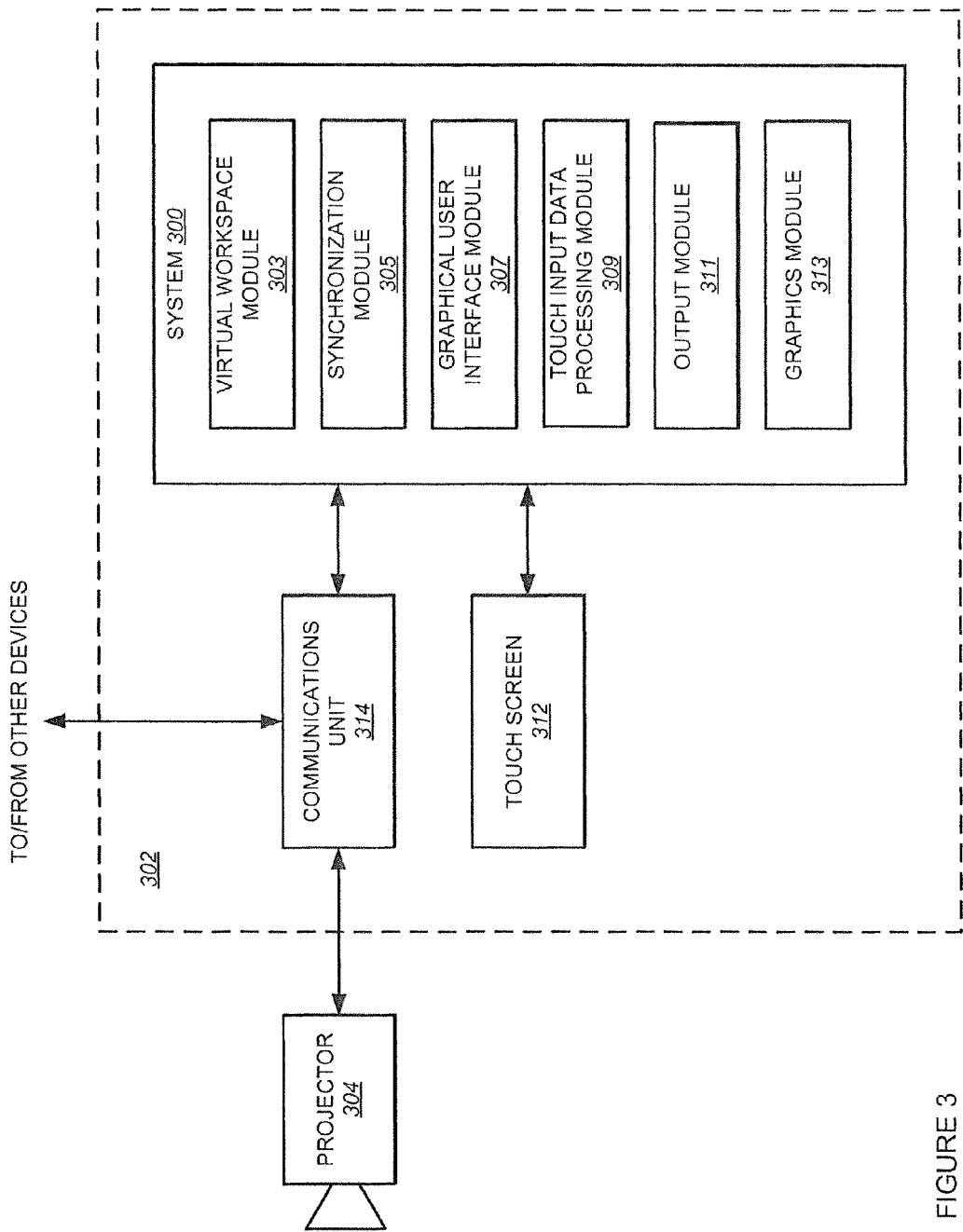
FIG. 3 is a block diagram of a system for facilitating visual expression on a portable computing device, in accordance with an embodiment.

FIG. 3 is a diagram illustrating a system 300 implemented at a computing device, such as the computing device 202 shown in FIG. 2, to facilitate collaborative visual expression. The system 300 comprises a virtual workspace module 303, a synchronization module 305, a graphical user interface module 307, a touch input data processing module 309, an output module 311 and a graphics module 313.

In general terms, a module refers to computer program logic for providing a specified functionality. A module can be implemented in hardware, firmware, software, or a combination thereof. For example, the modules may comprise executable code. Executable code may include one or more physical or logical blocks of computer instructions organized as routines, programs, objects, components, data structures, etc., which perform particular tasks or implement particular abstract data types. Thus, when referring to the functionality of a module in software applications, it will be understood that such functionality may be implemented by one or more processors when executing the module, or any portion thereof. Further, the code of a module need not be physically located together, but may include disparate instructions stored in different locations that, when joined logically together, include the module and achieve the stated purpose for the module.

The virtual workspace module 303 is configured to construct a virtual workspace at the computing device 302. Broadly speaking, a virtual workspace is an environment simulated by a computer. In more concrete terms, a virtual workspace may be defined by data describing its structure, functions and requirements (e.g., CPU and memory requirements). A virtual workspace may host objects. These may be two- or three-dimensional. Three-dimensional refers to the fact that the object may appear as if it were three-dimensional when displayed or that the object is computed in three dimensions, i.e. that it can be rotated in pan and tilt. Virtual workspaces can take many forms, and exemplary embodiments are described in more detail later. However, in one embodiment, the virtual workspace allows for visual expressions such as painting and animation.

The synchronization module 305 synchronizes the virtual workspace at the computing device with one or more other virtual workspaces at one or more respective collaborating computing devices (not shown). Synchronization ensures that two or more virtual workspaces are substantially consistent with and/or similar to each other, thus giving users the feeling that they are working within the same virtual workspace—in other words, a shared virtual workspace. This means that the "same" object can be perceived in the same way by users on multiple computing devices. In this regard, the skilled reader will appreciate that, at any given point in time, one user may not be viewing the same portion of the shared virtual workspace as another user.

In embodiments, the synchronization module 305 transmits data pertaining to the virtual workspace to a collaborating computing device over a wireless communications link established by means of communications unit 314.

Transmissions generally occur automatically. A data transmission can occur in response to a content change in the virtual workspace (i.e., event-driven). Alternatively, or additionally, data can be transmitted continuously, for example at periodic intervals such as several times a second. The data pertaining to a virtual workspace may describe a change in the virtual workspace relative to an earlier state of the virtual workspace. Thus, when the virtual workspace of one user changes, the other virtual workspaces may change accordingly to keep the virtual workspaces synchronized. Of course, some amount of delay generally exists in this synchronization, as the updated information is communicated over a communication network. Once received by a collaborating computing device, the data can be processed as if the changes had been generated locally, so that a change to one of the virtual workspaces is reflected in the other one of the virtual workspaces.

The graphical user interface module 307 is configured to generate a graphical user interface that is to be displayed at the touch screen 312. The graphical user interface presents an individual view of the virtual workspace, i.e. a visual representation of the virtual workspace, so that each user may independently view and navigate the virtual workspace. An exemplary graphical user interface layout is described with reference to FIG. 22. The graphical user interface module 307 also enables the user to interact with the virtual workspace, including but not limited to, creating, modifying, deleting or otherwise changing the virtual workspace or the objects hosted by the virtual workspace. In its broadest sense, an object is any data in any format suitable for the virtual workspace. Objects may be of different types. Some examples of objects include content objects and meta objects. Content objects may comprise audio, visual, or audio-visual data. Audio data refers to data that represents one or more sounds. Visual data refers to data that represents one or more images. Visual data may comprise algorithms that generate one or more images. Visual data may also define one or more interactive images (i.e., images which allow the user to interact with a displayed representation thereof, such as digital puppets). Audio-visual data refers to data that represents one or more sounds and one or more images. An image can be a painting, drawing, sketch, photograph, video still, etc., or any combination thereof. Visual data representing a sequence of images susceptible of being displayed over time may define a video or animation. An audio, visual, or audio-visual may be divided into elements, each of which may itself be a content object. Meta objects are objects that act on other objects. In other words, these objects do not have an audio and/or visual manifestation themselves, but rather influence the behaviour of other objects such as the content objects. This can include, for example, deflecting, deforming, constraining, linking, presenting, or otherwise affecting objects. For example, a presentation space object defines which content objects in the virtual workspace are to be presented The touch input data processing module 309 is configured to receive data pertaining to touch input detected by the touch screen 312 and/or other touch input device associated with the portable computing device, and process it in connection with the graphical user interface. Thus, the data may be correlated to functionality provided by the graphical user interface, such as painting and animating. The data may pertain to, for example, a touch location (e.g. an X, Y coordinate value) or touch locations, a touch movement, the size and shape of the area being touched, the degree of contact, i.e. "pressure", and so on. The touch input data processing module 309 may provide data to other modules or components of the system or computing device.

The output module 311 is configured to output data pertaining to content that is to be displayed using a display device such as projector 304. The form in which this is sent may vary according to the display/projector technology being employed, and these will be familiar to the skilled person.

Figure 17:
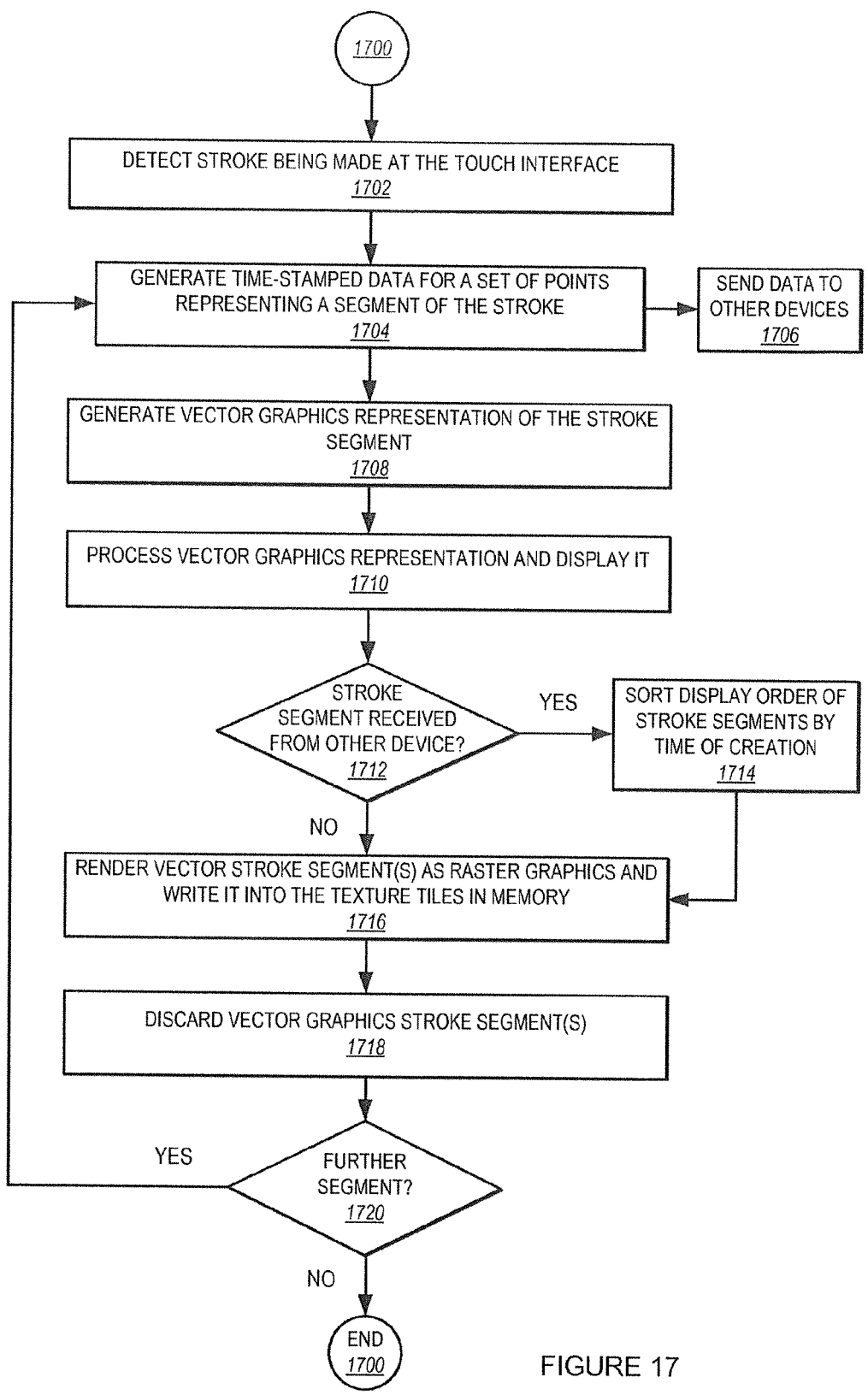
FIG. 17 is a flowchart of a process for generating graphics for a stroke segment, in accordance with an embodiment.

The graphics module 313 processes data for the images to be displayed on the touch screen 312. It may also process data for the images to be projected by the projector 304. The data may be received from other modules of the system. For example, the synchronization module 305 may provide data received from other devices, while the touch input data processing module 309 may provide data generated in response to touch input detected at the touch screen 312. In some embodiments, the functionality provided by the graphics module may be carried out by existing hardware and/or software of the computing device 302 and projector 304. Accordingly, graphics module 313 is entirely optional. However, in other embodiments, a process as described with reference to FIG. 17 is implemented.

Although the modules are depicted as separate modules for the sake of clearly setting forth the functions provided by the system, it should be understood that some embodiments of the system may split or combine the functions of each module into more or less modules.

IV. Establishing a Shared Virtual Workspace

Figure 4:
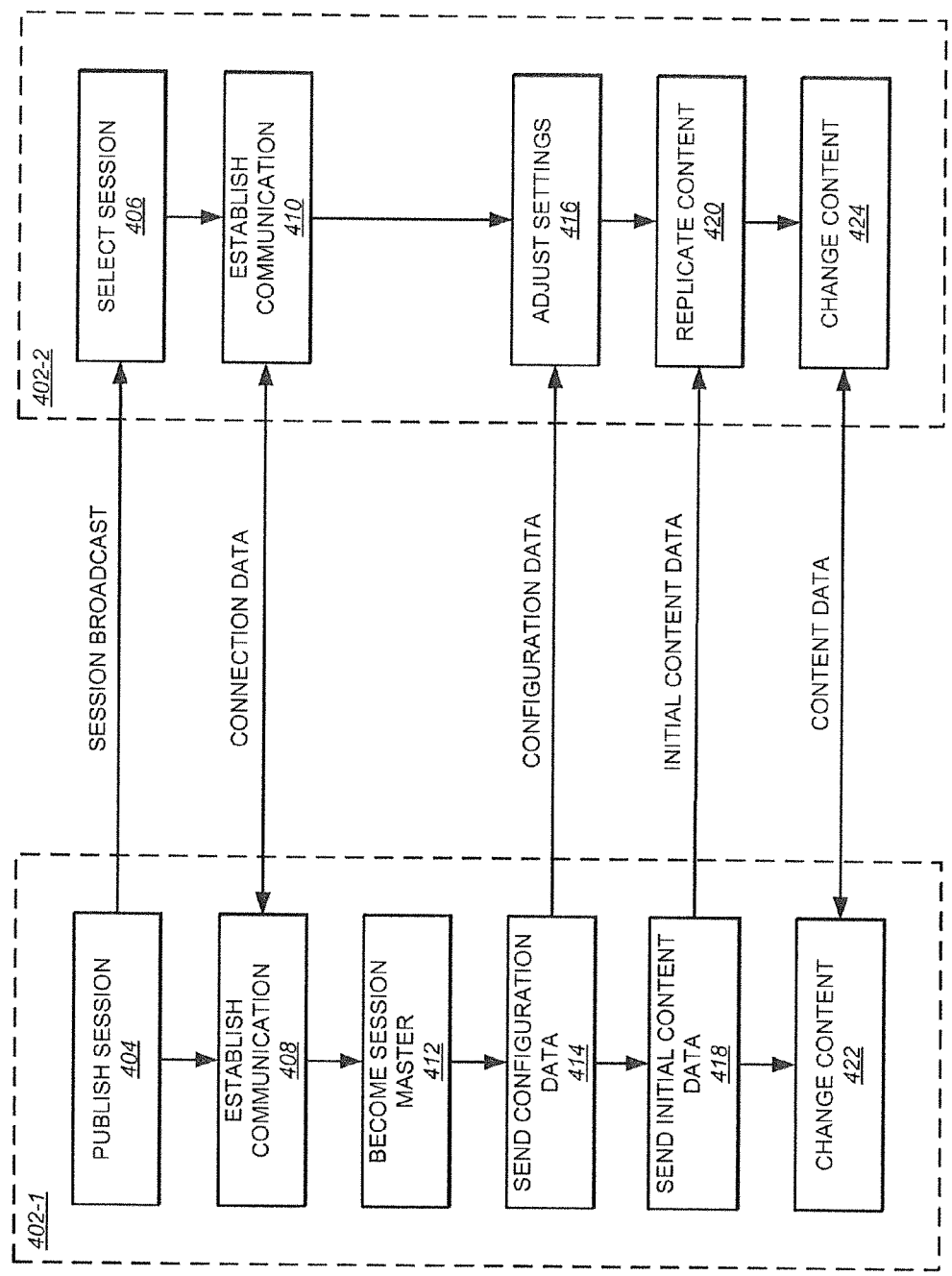
FIG. 4 illustrates a process for establishing a shared virtual workspace among two computing devices, in accordance with an embodiment.

FIG. 4 illustrates a process for establishing a shared virtual workspace between computing devices, in accordance with an embodiment.

Users of computing devices 402-1, 402-2 intend to participate in a collaborative session. At block 404, computing device 402-1 publishes session information to alert other computing devices to its presence, and the different ways in which this can be achieved will be familiar to those skilled in the art. At block 406, a user of computing device 402-2 selects to join the session. At blocks 408 and 410, the computing devices 402-1, 402-2 establish a communications link, such as a wireless communications link. Upon joining the session, device 402-2 constructs a virtual workspace in accordance with that of device 402-1. As such, at block 412, device 402-1 becomes the workspace session "master". This designation is used to indicate that the user of device 402-1 is the owner of the session. The owner may have certain rights, such as the ability to determine who may join the session using a password mechanism or other means. At blocks 414 and 418, device 402-1 sends workspace configuration data and initial content data to device 402-2. The data is received at blocks 416 and 420, respectively. This enables device 402-2 to construct a virtual workspace including any content already created by a user of device 402-1. At blocks 422 and 424, the computing devices 402-1, 402-2 process received touch inputs and send data pertaining to touch inputs to each other, as has already been discussed.

It is to be appreciated that the process described with reference to FIG. 4 can be readily extended to more than two devices, with other devices joining (and leaving) the session of device 402-1 as desired, subject to any joining restrictions set by the "master". In such cases, different data distribution schemes can be implemented. In one embodiment, the "master" device receives data describing touch inputs from each of the other collaborating devices, updates its virtual workspace accordingly and distributes the new state of the virtual workspace to the other collaborating devices for updating their virtual workspaces. In another embodiment, akin to a peer-to-peer architecture, each collaborating device updates its virtual workspace in response to changes made locally and sends data describing the change to all of the other collaborating devices for updating.

V. Virtual Workspaces

Figure 5:
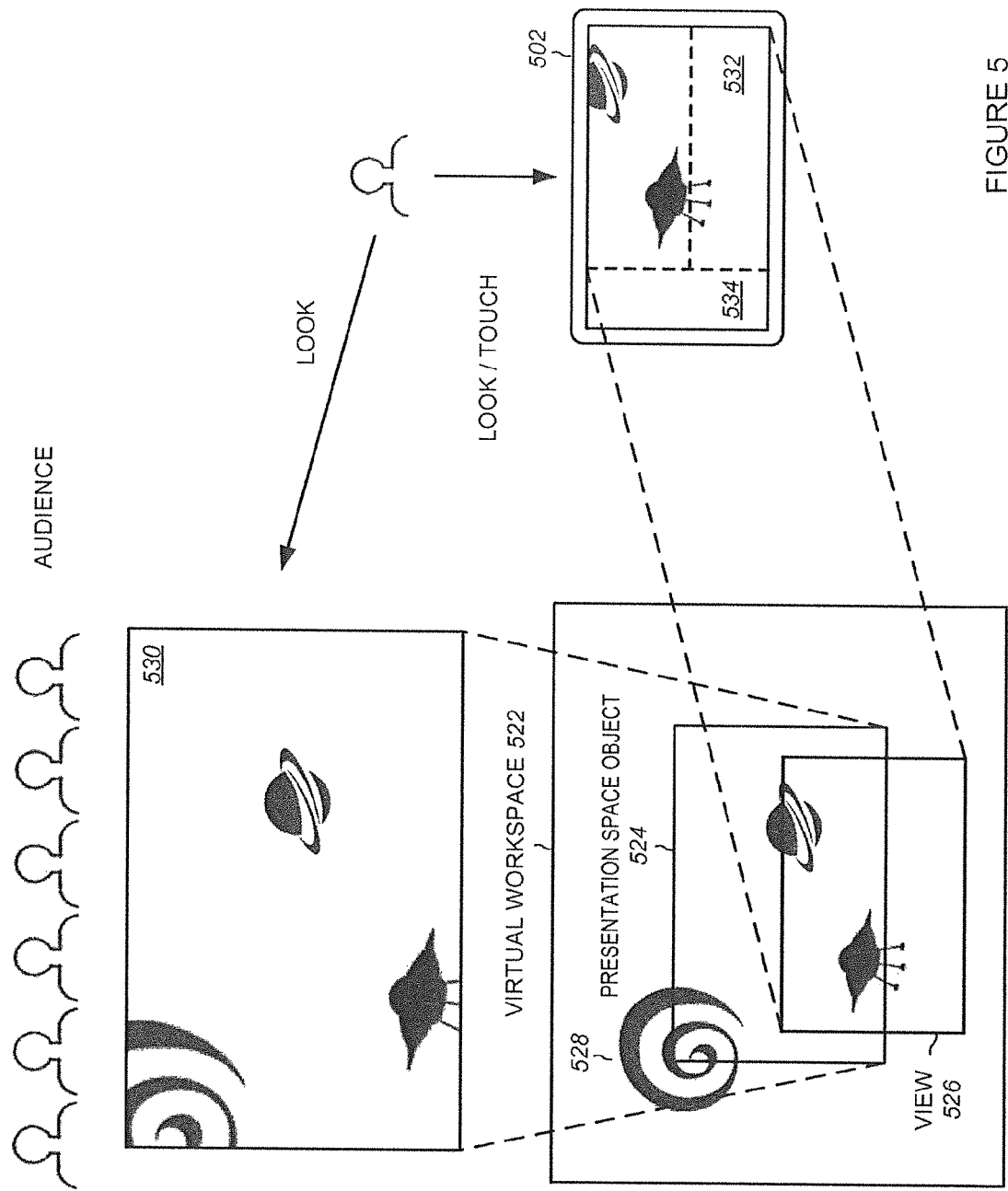
FIG. 5 is a schematic representation of a virtual workspace in the context of a visual performance, in accordance with an embodiment.

FIG. 5 is a schematic representation of a virtual workspace in the context of a visual presentation, in accordance with an embodiment.

The virtual workspace 522 is configured to host objects. As shown, the virtual workspace 522 is hosting content objects, such as content object 528, and presentation space object 524. Content objects or portions of content objects overlapping with the presentation space object 524 are projected or otherwise displayed in real-time, or near real-time, onto a surface 530 (the display device is not depicted for reasons of clarity), where they can be viewed by an audience. Presentation space object 524 may be a subspace of virtual workspace 522, in that some but not all content objects in virtual workspace 522 overlap with the presentation space object 524. In some cases, the presentation space object 524 may cover substantially the entire virtual workspace 522. Furthermore, there may be a single presentation space object, or many presentation space objects, possibly with some overlapping. Objects may be positioned at different depths within the virtual workspace, and this is discussed in more detail further below.

A view 526 of the virtual workspace 522 is displayed at the computing device 502, and provides a "window" into the virtual workspace 522 and within which the user desires to work. The view 526 is displayed at the computing device 502 within a portion 532 of a graphical user interface layout that may also include a sidebar 534 that provides certain control functionality. Exemplary functionality is described below with reference to FIG. 22. The view 526 can be navigated and scaled within the virtual workspace 522. For example, the view 526 can be navigated by holding (or tapping) a graphical element within the sidebar 534 and performing a touch gesture in the direction in which the work area is to be moved. In order to aid the user, the view 526 can be zoomed in or out, for example to the boundary of the virtual workspace, using a pinch/spread gesture. The virtual workspace 522, as well as the presentation space object 524, may be set and adjusted by the user of computing device 502. The virtual workspace 522 may have different dimensionality (e.g. two-dimensions or three-dimensions). Three-dimensional workspaces can be displayed stereoscopically or via other suitable methods for displaying three-dimensional content. Also, the virtual workspace 522 may "wrap around" such that an animation moving off one edge of the virtual workspace may appear at an opposite edge of the virtual workspace.

Figure 6:
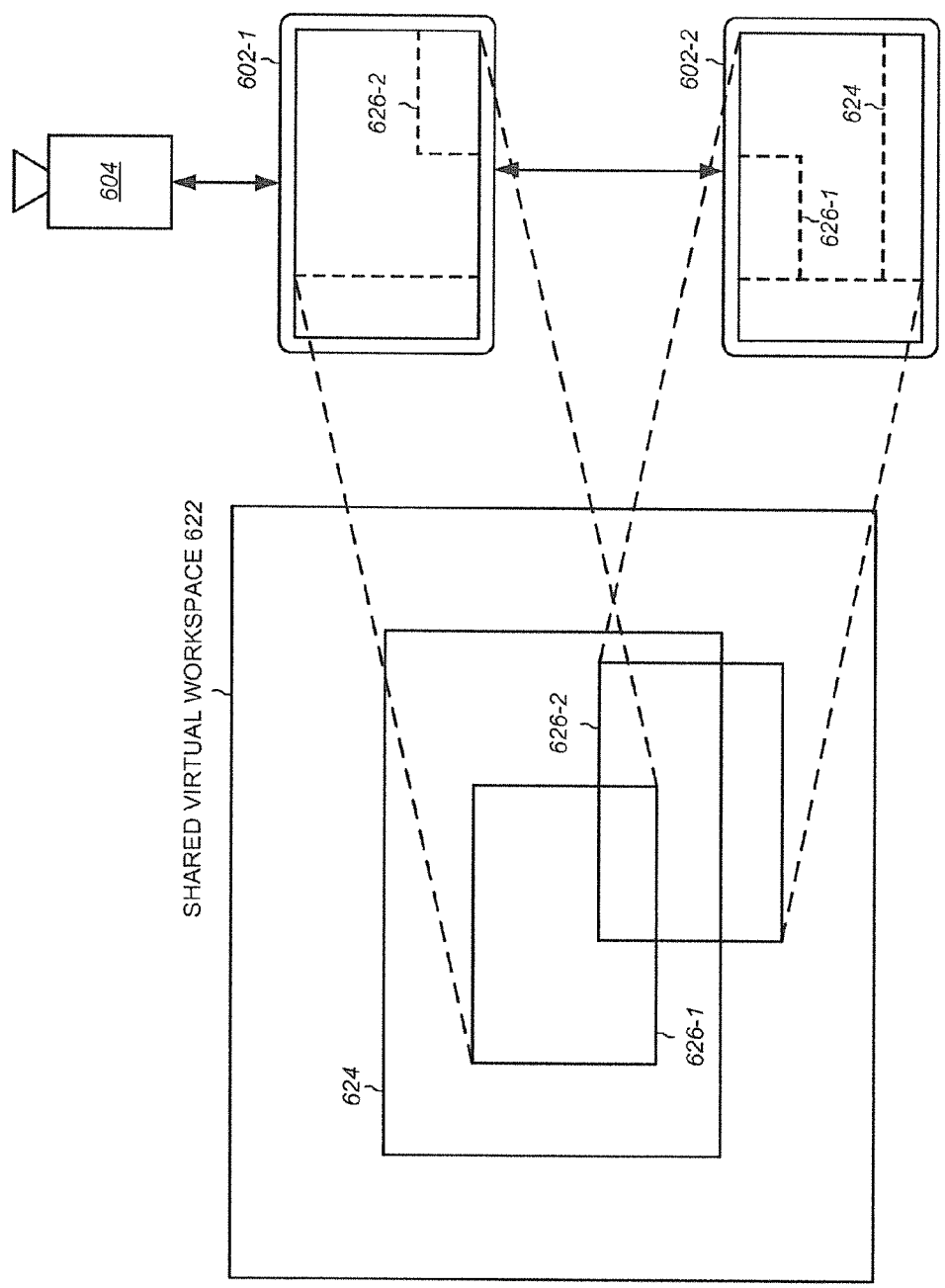
FIG. 6 is a schematic representation of a shared virtual workspace in the context of two collaborating computing devices, in accordance with an embodiment.

FIG. 6 is a schematic representation of a shared virtual workspace in the context of two collaborating devices, in accordance with another embodiment.

In FIG. 6, only one virtual workspace is shown for reasons of clarity, but it is to be appreciated that each of the computing devices 602-1, 602-2 is running its own virtual workspace, synchronised by exchange of data, to form shared virtual workspace 622. As in FIG. 5, the shared virtual workspace 622 comprises a presentation space object 624. As such, it will not be described in more detail here. Also shown are the user-specific views 626-1, 626-2 of the shared virtual workspace seen by the users of the computing devices 602-1, 602-2. In some embodiments, an outline of the other user's view 626-1, 626-2, as well as the presentation area 624, is visible in each graphical user interface in order to enable that user to see where the other user is working. In general, there is no limit to which part of the virtual workspace users can view, so that the views 626-1, 626-2 may overlap one another, as shown. Presentation space object 624, in this exemplary embodiment, is the only presentation space object, so that only one projection takes place using display device 604, e.g., projector 604. In other embodiments however, multiple presentation space objects exist, for example one per display device.

Further aspect of the virtual workspace are described in the context of the graphical user interface.

VI. Image Distortion Compensation

When using a projector as a display device, image distortions may arise when the surface onto which content objects are being projected is not perpendicular with respect to the direction of projection. Embodiments allow users to compensate or correct for this.

Figure 7:
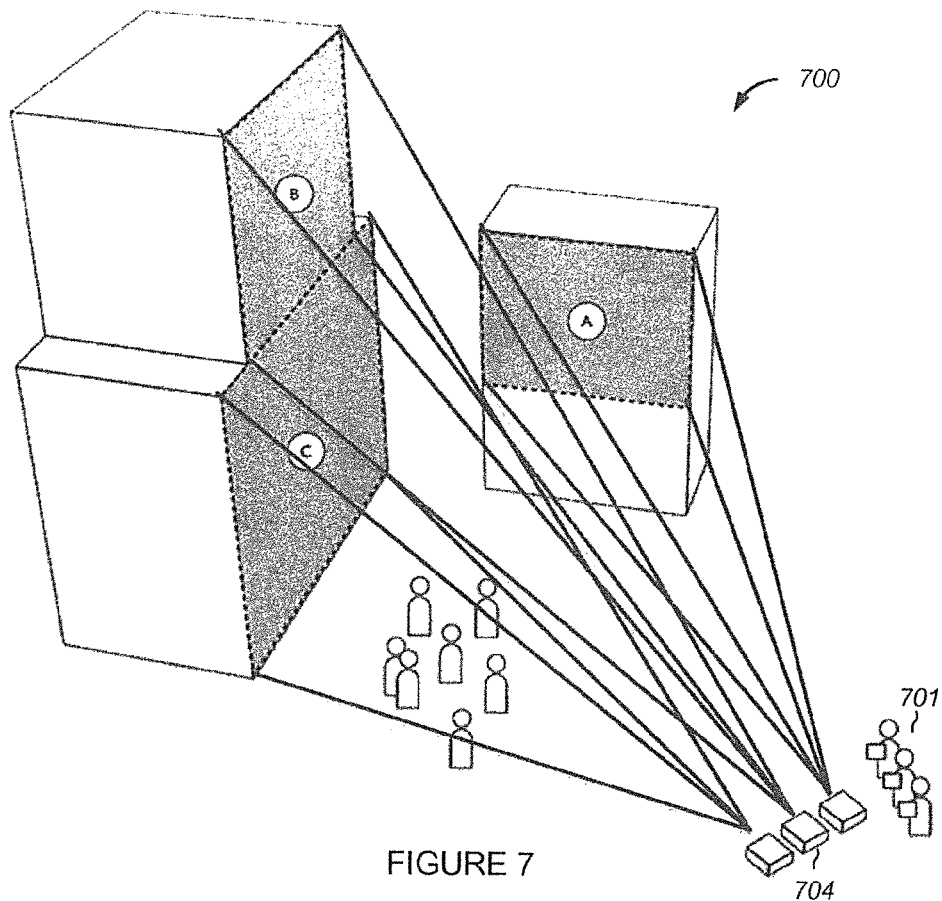
FIG. 7 schematically depicts a visual performance using multiple computing devices and projectors, in accordance with an embodiment.

FIG. 7 schematically depicts a visual presentation 700 in which multiple (here, three) users 701, each using a portable computing device, are collaborating. In this example, three projections are being made onto surfaces (denoted by shaded areas labelled "A", "B" and "C") oblique to the projection directions of three respective projectors 704. Here, the three projectors 704 receive data from respective computing devices, whose virtual workspaces are synchronized. Naturally, fewer or more than three computing devices may be utilised. Also, the data may be sent to the three projectors 704 by only one or some of the computing devices.

Figure 8:
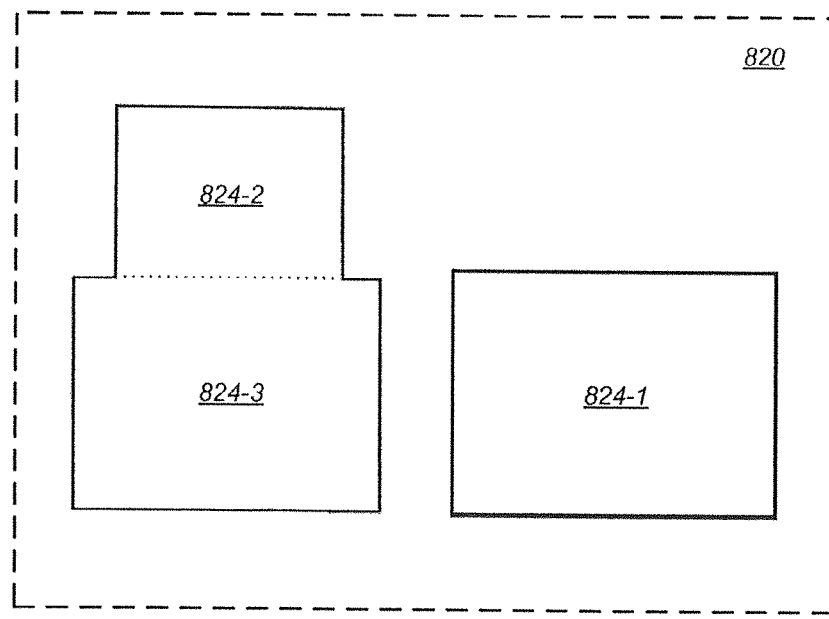
FIG. 8 is a schematic representation of a shared virtual workspace established between the computing devices shown in FIG. 7.

FIG. 8 is a schematic representation of a shared virtual workspace 820 within which the users 701 of FIG. 7 are working. The shared virtual workspace 820 contains three presentation space objects 824-1, 824-2, 824-3 of different sizes and corresponding respectively to the three projections "A", "B" and "C" shown in FIG. 7. Presentation space objects 824-2, 824-3 are "snapped" together at one edge to form an enlarged presentation area corresponding to surfaces "B" and "C". This means that visual objects may span two or more presentation space objects.

Figure 9:
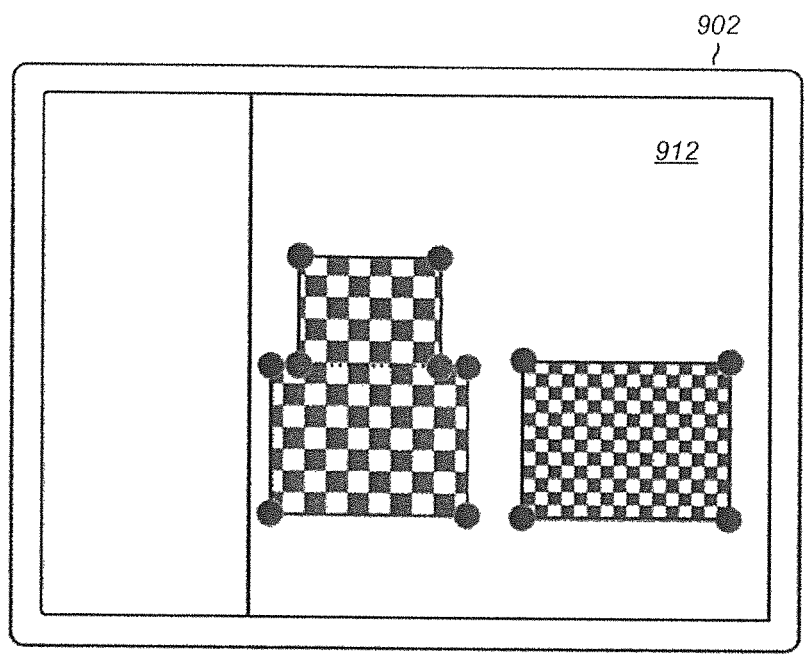
FIG. 9 schematically depicts a view of the shared virtual workspace of FIG. 8 as seen using a computing device.
Figure 10:
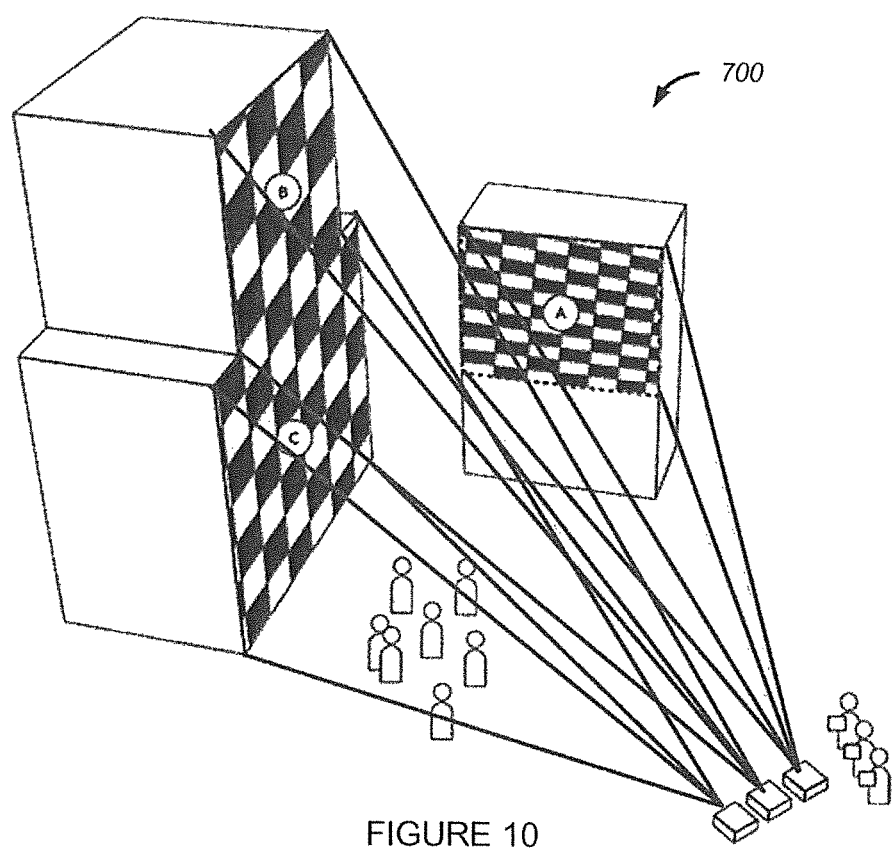
FIG. 10 schematically shows the projections defined by the presentation space objects of FIGS. 8 and 9 onto oblique surfaces.

FIGS. 9 and 10 schematically show how content objects within the presentation space objects 824-1, 824-2, 824-3 become distorted when projected onto oblique surfaces. To show this in the figure, the rectangles representing the presentation space objects are filled with a checkered pattern. While these patterns are undistorted when viewed on the screen 912 of computing device 902, as shown in FIG. 9, the patterns appear stretched and skewed when projected onto the oblique surfaces, as can be seen in FIG. 10.

In one embodiment, to correct for such distortion, the presentation space objects can be adjusted using touch input, and determining by eye whether the resulting displayed presentation area is undistorted.

Figure 11:
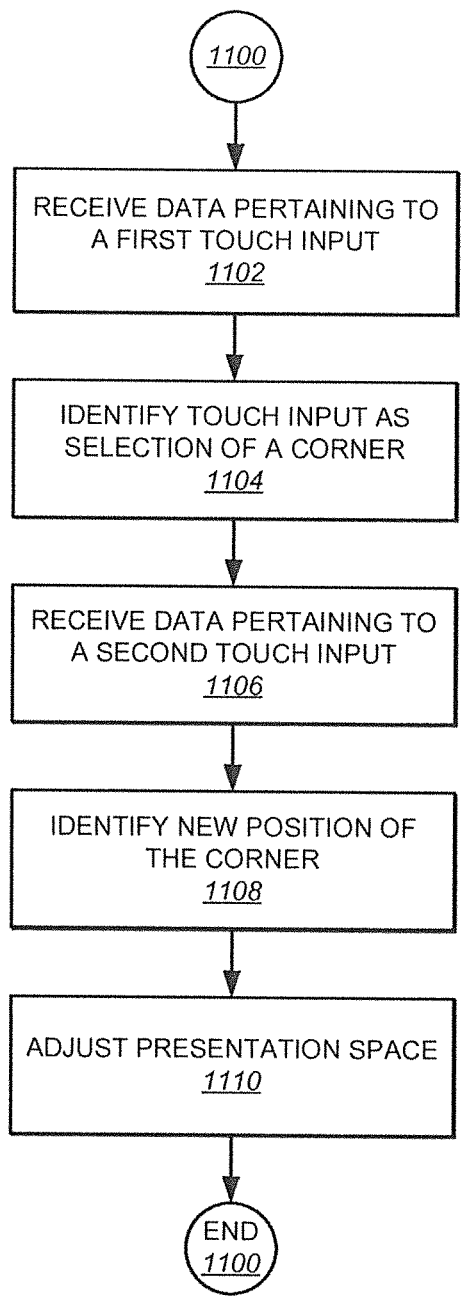
FIG. 11 is a flowchart illustrating a method for adjusting the presentation space objects, in accordance with an embodiment.

FIG. 11 is a flowchart illustrating a method for adjusting the presentation area using a "touch-and-drag" gesture. Method 1100 begins at block 1102 with receipt, for example by the touch input data processing module 309 of FIG. 3, of data pertaining to a first touch input indicating that the user has touched the touch input device associated with the computing device using his finger (or other object). If the location of the touch is identified as corresponding to one of the corners of a graphical representation of the presentation space object provided by the graphical user interface, then at block 1104 the data is interpreted as a selection of that corner. At block 1106, data pertaining to a second touch input indicating that the user has moved his finger (or other object) is received. At block 1108, a new position of the corner is determined. At block 1110, the presentation space object is adjusted accordingly. Naturally, more than one corner can be selected and moved at the same time. Other ways of selecting and moving a corner include tapping the touch interface twice, first to select the corner and then to indicate a target location. It will be appreciated that the determination need not be limited to the corners. For example, a determination may be made that an edge of the presentation area has been selected and moved.

Referring back to FIG. 9, in order to aid the user, the corners may be highlighted on the screen 912 of the computing device 902 using a visual cue. For example, selectable corners can be marked as black, filled-in circles while corners that cannot be selected are highlighted as grey filled-in circles or, alternatively, are not highlighted at all. Corners of the latter type include those lying on an edge of another presentation space object (i.e. "snapped" to the edge), and these may be repositioned automatically.

Figure 12:
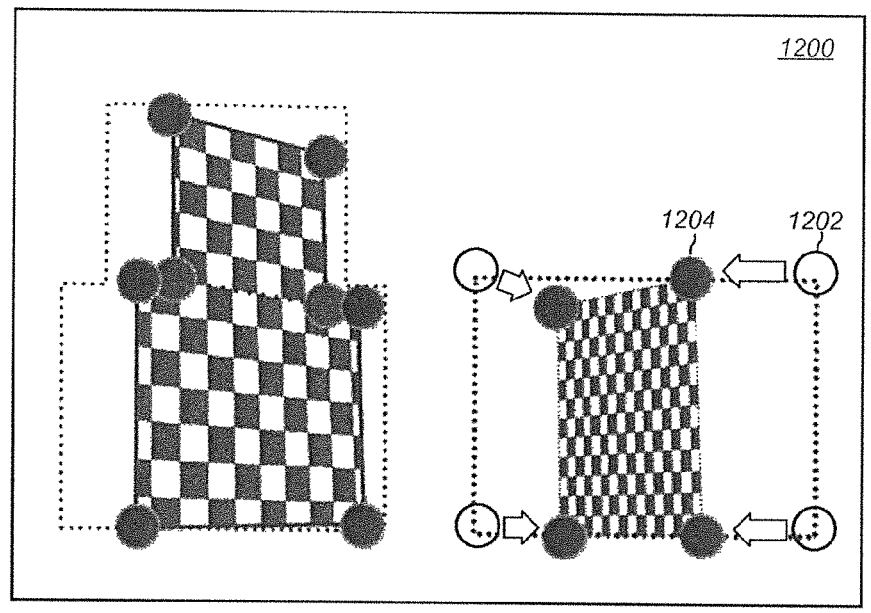
FIG. 12 schematically depicts a view of the shared virtual workspace of FIG. 9 after adjustment of the presentation space objects.

FIG. 12 schematically shows a view 1200 of the virtual workspace including the presentation space objects subsequent to adjustment processes having been performed in respect of multiple corners, with the dotted rectangles representing the original presentation space objects. The result of a corner movement using a gesture as described with reference to FIG. 11, from a first position 1202 to a second position 1204 is indicated by the arrow. For clarity, not all of the movements are shown.

Figure 13:
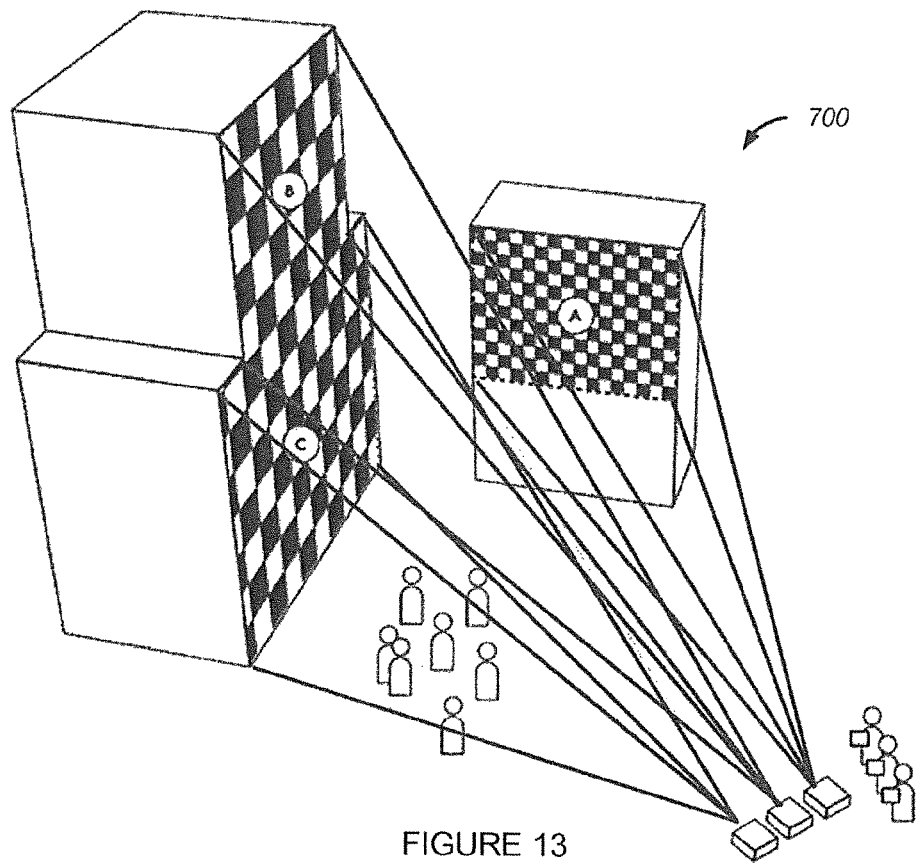
FIG. 13 schematically shows the projections defined by the presentation space objects of FIG. 12 onto oblique surfaces subsequent to adjustment.

FIG. 13 schematically depicts the visual presentation of FIG. 10 after the presentation space objects have been adjusted in accordance with what is shown in FIG. 12, and is provided to demonstrate to the reader how presentation space objects in a virtual workspace can be adjusted so that projections onto oblique surfaces without distortion can be achieved. As seen in FIG. 13, the distortions of projections "A", "B" and "C" have been significantly reduced or eliminated.

Figure 14:
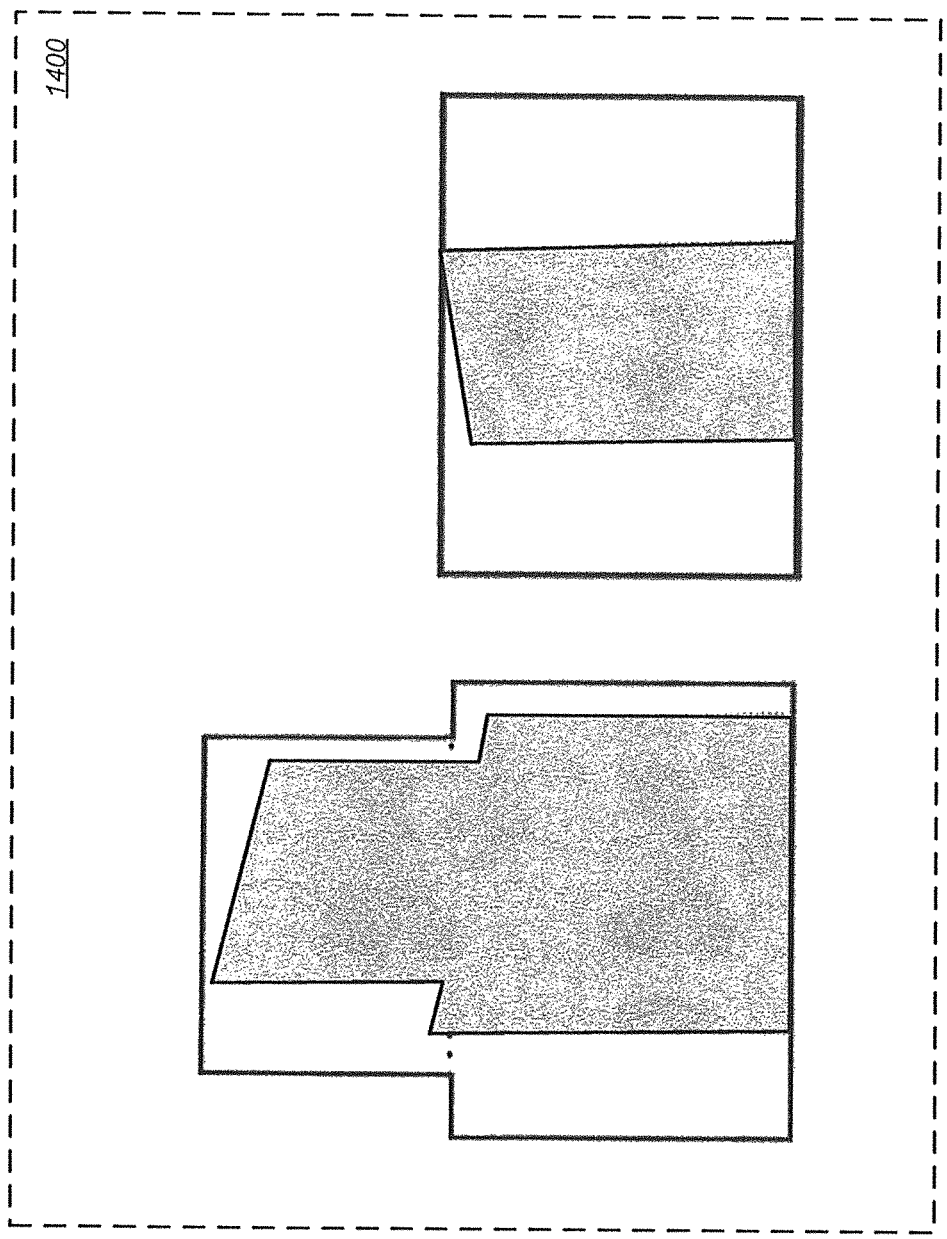
FIG. 14 provides an illustrative comparison of in the pre- and post-adjusted presentation space objects shown in FIG. 12.
Figure 15:
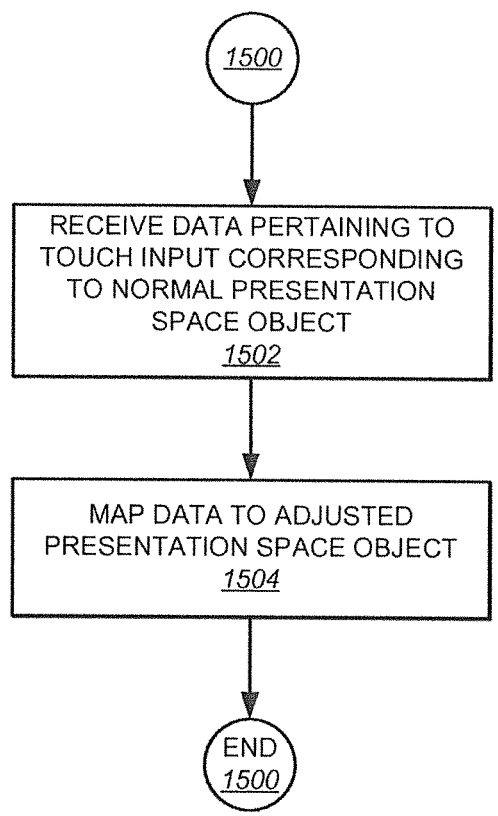
FIG. 15 is a flowchart of a process for mapping between normal and adjusted presentation space objects, in accordance with an embodiment.

It will be apparent from FIG. 12, that the graphical representations of the presentation space objects in their adjusted form are not ideal for use at the computing device, since they themselves may be "distorted" from the point of view of the user. It is therefore desirable to provide a normal representation of the presentation space object to the user, i.e. an undistorted or "front-on" view from the user's perspective. Accordingly, each presentation space object may thus effectively comprise a normal presentation space object that is displayed at the graphical user interface and a compensated presentation space object that is used for display in a vicinity of the computing device. These are shown schematically in FIG. 14 as the white and shaded polygons, respectively. With reference now also to FIG. 15, the touch input data processing module 309 may map between the normal presentation space object and adjusted presentation space object. In particular, when data pertaining to a touch input corresponding to the normal presentation space object is received (block 1502) the data is mapped to the adjusted presentation space object (block 1504).

Figure 16:
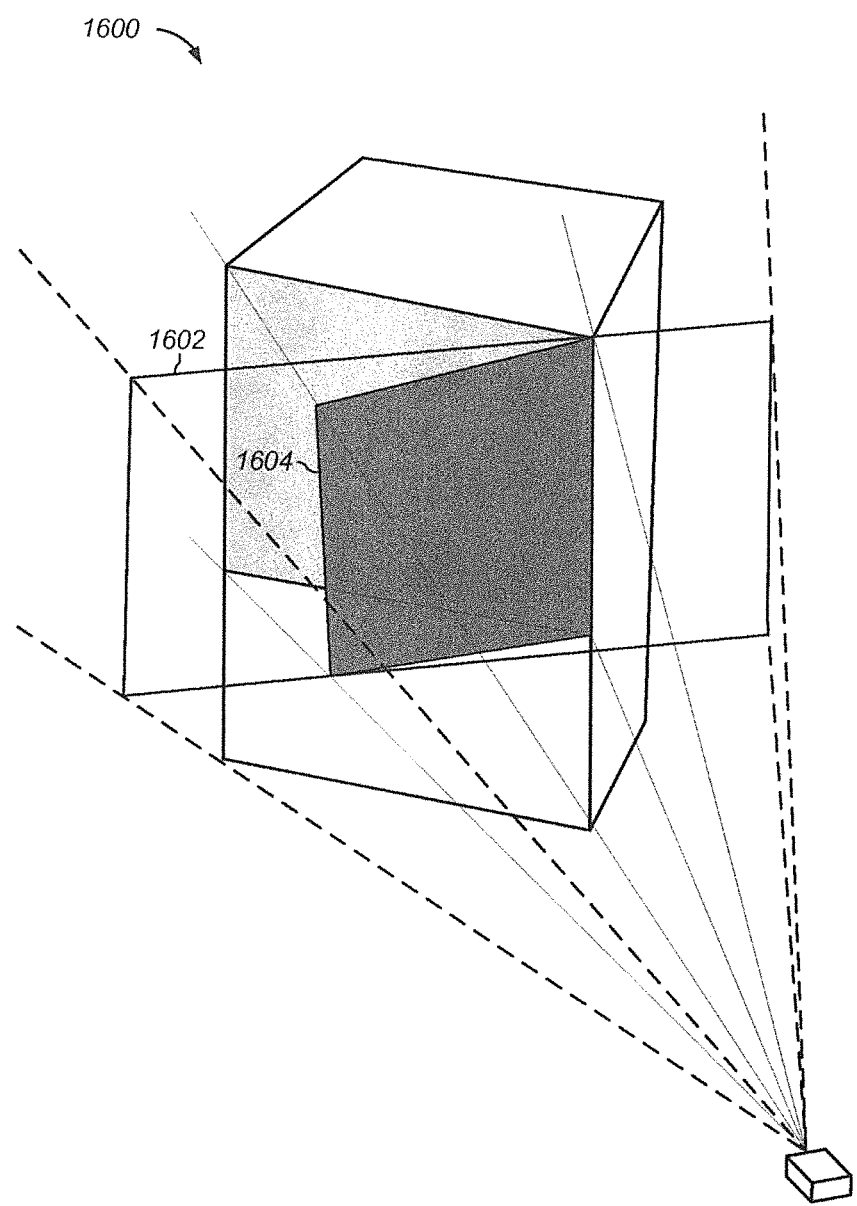
FIG. 16 schematically shows the projection of an adjusted presentation space object, in accordance with an embodiment.

It is to be appreciated that the presentation space object adjustment process described above may result in an adjustment to the projection beam itself or the information carried by the projection beam. For example, and with reference to FIG. 16, which shows projection "A" of FIG. 13 in more detail, the adjustment process may result in an adjusted projection beam having a cross-section corresponding to polygon 1604, or an adjustment to the information carried within a projection beam having a cross-section corresponding to polygon 1602 (with the adjusted presentation space object represented by polygon 1604).

VII. Image Data Processing

FIG. 17 is a process 1700 for processing image data that makes efficient use of the computing device's memory, and combines the respective advantages of vector and raster graphics representation of paint strokes.

Figure 21:
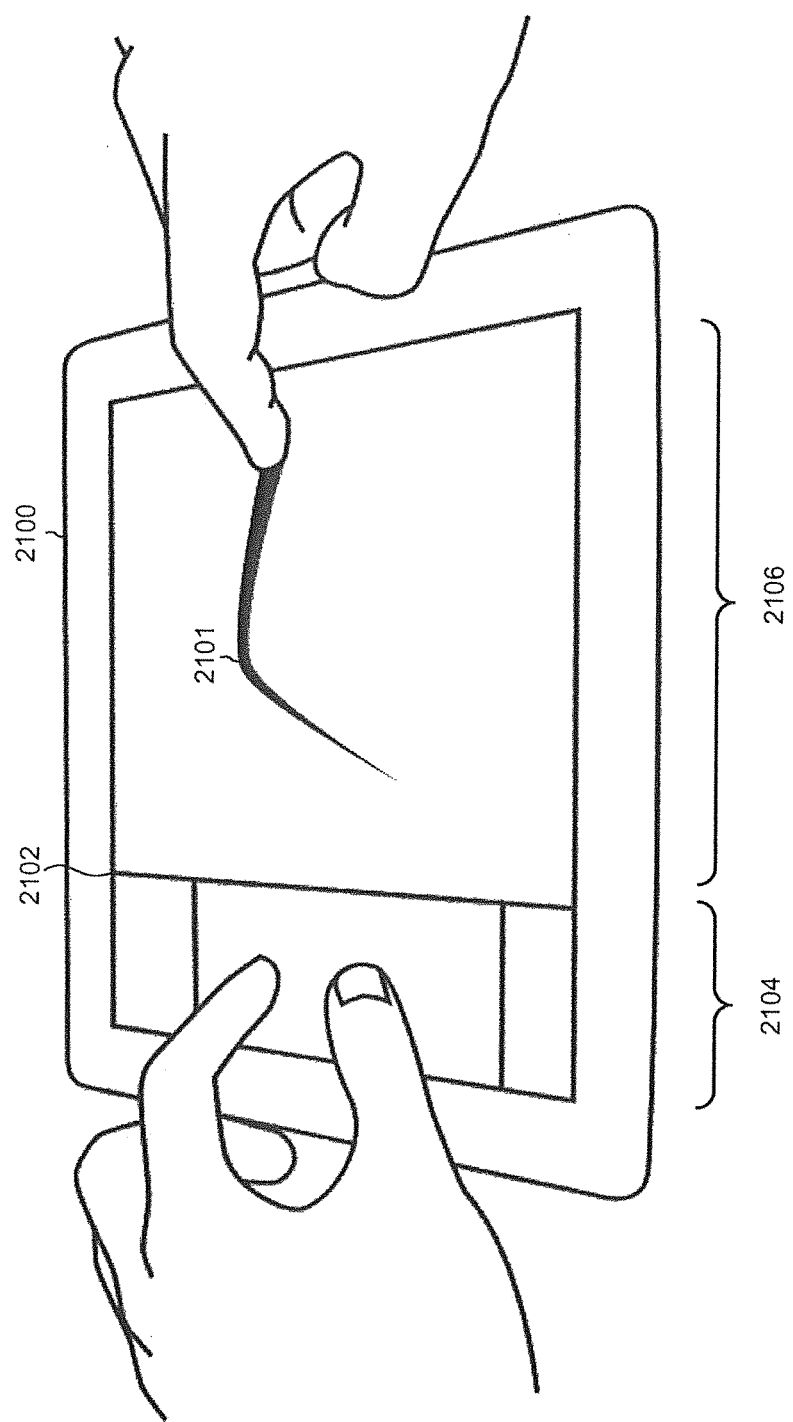
FIG. 21 schematically depicts a multi-touch touch gesture being performed on a portable computing device, in accordance with an embodiment.

The process 1700 begins at block 1702 with the detection of a stroke being made at the touch input device. For example, FIG. 21 schematically shows a stroke 2101 being made on a touch screen of a portable computing device 2100. A stroke can be thought of as a set of points, starting from an origin point to a destination point and proceeding along a path, representing the movement of an object, such as a finger or stylus, at the touch input device. As the stroke may extend for some length, and may contain many tens, hundreds or even thousands of points, the stroke may be processed in segments. A stroke can include sub-elements, representing a series of repeating patterns corresponding to bristles of a brush. In that case, the segment can be defined by one or more sub-elements.

At block 1704, a set of data representing a stroke segment is generated, for example by the touch input processing module 309 described with reference to FIG. 3. This data is subjected to processing by graphics module 313, which converts it into image data allowing display at the touch screen 312. Generally, the data for each point includes touch input data (e.g., coordinate data) and associated data (e.g., hue, saturation, opacity) specifying how the stroke will look when it is displayed on a display. For example, touch interfaces that support pressure sensing can allow artists to create thicker or darker lines when greater pressure is applied and thinner or lighter lines when less pressure is applied. The data for each stroke segment may also include timestamp data. At block 1706, the generated data is sent to collaborating devices, to enable the virtual workspaces to remain synchronised.

Image data can be classified into raster graphics and vector graphics. Raster graphics, also known as bitmap graphics, represent an image as a rectangular grid of pixels, whereas vector graphics uses mathematical formulas to represent the image. As such, vector graphics are stored as a sequence of vector statements, whereas raster graphics are stored as data describing a texture composed of pixels. Data such as colour values are stored for every pixel of the texture, even if there is nothing drawn in it. This means that raster graphics have greater memory requirements compared to vector graphics. However, vector graphics are not well suited for representing photorealistic images or images with complex shapes and shadings.

Figure 18:
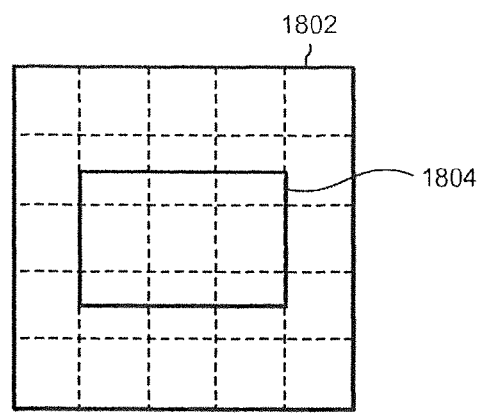
FIGS. 18 to 20 are a sequence of diagrams schematically showing how textures are generated for regions corresponding to a stroke input, in accordance with an embodiment.

To reduce the memory requirements associated with the use of raster graphics, the virtual workspace is divided into regions (tiles) so that raster graphics textures do not need to be stored for portions of the virtual workspace that contain no content. For example, FIG. 18 schematically shows a virtual workspace including a content space 1802 and a presentation space object 1804, divided into tiles (depicted as squares with dotted lines). Although these are shown as being of equal dimension, other configurations are contemplated.

Referring again to FIG. 17, at block 1708 a vector graphics representation of the stroke segment is generated. The use of vector graphics (prior to rendering the vector stroke segment as raster graphics, at block 1716) may provide a number of advantages. For example, while the stroke segment exists in vector form, it can be dynamically processed and optimized. Also, when two artists are working on the same object, precedence can be considered at this stage as soon as stroke data is received. Furthermore, it may assist in dealing with delays associated with synchronization.

At block 1710, the vector graphics representation of the stroke segment is processed and displayed. Processing can include, for example, curve interpolation between points, path smoothing, and adding line start and end caps (or tapering).

Figure 19:
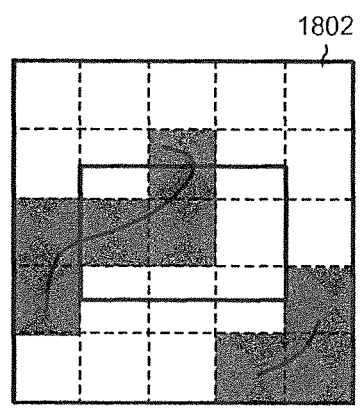
Figure 20:
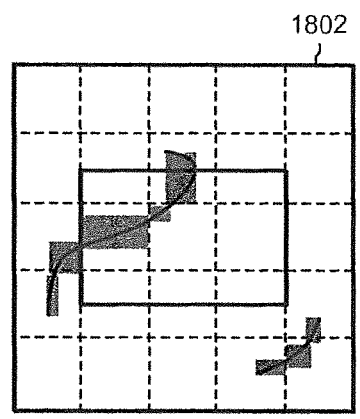

At block 1712, a determination is made as to whether data corresponding to a stroke segment has been received from another device. It will of course be appreciated that one or more stroke segments may be received from one or more other devices. In embodiments, the received data comprises data similar to that generated at block 1704. As this data is also time stamped, the display order of data generated at collaborating computing devices can be determined at block 1714 according to when the data was generated. The process then proceeds to block 1716. Here, the vector graphics stroke segment (or ordered vector graphics stroke segments, as the case may be) is rendered as raster graphics, and written ("baked") to the texture in memory. As shown in FIG. 19, two lines corresponding to strokes are shown, with the texture tiles affected by the strokes shown as shaded squares. In embodiments, textures are created for entire tiles. However, in other embodiments, textures are created only for portions of the tiles. This is shown in FIG. 20. At block 1718, the texture is displayed and the vector graphics representation of the stroke segment (or segments) is discarded. It is to be appreciated that the sequence of steps is not limited to that described above with reference to FIG. 17.

VIII. Overview of Graphical User Interface and User Roles

Referring now to FIG. 22, and also briefly to FIG. 21, in one embodiment, the layout of a graphical user interface 2102, 2202 comprises a sidebar 2104, 2204 and a view area 2106, 2206. The view area 2106, 2206 presents a view of the virtual workspace, including an outline of a presentation space object 2226. The sidebar 2104, 2204 provides various functionality, for example enabling the user to switch between roles. In embodiments, each role is associated with a different sidebar, such as sidebar 2208 and sidebar 2210.

As illustrated, each of the sidebars 2208, 2210 is divided into three regions 2212, 2214, 2216. Region 2212 includes three graphical elements 2218, 2220, 2222 that provide access to functions which are independent of the user roles. Exemplary graphical elements include a button 2218 for changing settings (e.g. display settings), a button 2220 for managing the collaborative session, and a button 2222 for capturing and sharing a picture of the virtual workspace and its contents. In this context, a user activates a button by touching an area of a graphical user interface corresponding to the button. Region 2214 includes elements whose functions are specific to the user the user roles, and these will be discussed in more detail below. Navigation button 2216 enables navigation inside the view 2206, while activated. In particular, the virtual workspace can be navigated by holding the navigation button and simultaneously performing gestures in the view 2206. For example, a user can move around the virtual workspace by holding the navigation button and dragging anywhere in the artistic view. Thus, an upward gesture on the screen will result in a corresponding upward move within the virtual workspace, a movement to the left of the screen will result in a corresponding leftward move within the virtual workspace, and so on. The view can also be zoomed, for example by holding the navigation button and performing a two-finger pinch/spread gesture anywhere in the artist view. A single tap of the navigation view zooms out to show the whole virtual workspace, and to center the view on a position within the virtual workspace the navigation button can be held and the desired position in the virtual workspace tapped. The navigation button 2216 also includes an element 2244 that serves to switch between the roles. In particular, the user may touch and slide the element 2244 to one side. This results in the whole sidebar sliding "off" the screen, while simultaneously sliding the other sidebar "onto" the screen.

As noted previously, different user roles may be supported. In embodiments, the user roles comprise an object creation role and an object management role. An overview of these roles is provided below, with a more detailed explanation provided subsequently.

The content creation role is for creating objects. In embodiments, this role comprises a digital painting role. Broadly speaking, digital painting involves a sequence of modifications of the colour and opacity values of local areas of a digital image. The modifications to be performed are typically specified by user-entered strokes of a digital "brush", which may define characteristics such as hue, saturation, brightness, transparency, and thickness. However, it will be understood that digital painting covers all of the different painting effects based on the movement of a given digital brush across the image being painted. Content creation role functions may therefore include one or more of the following:

Paint an image.
Change brush properties on the fly.
Erase within an object.
Aim the cursor on the external display.
Release an object for animation.
Pick a color from existing images.
Choose depth position for painting.

The content management role is for managing objects, such as manipulating objects (e.g. grouping, separating, slicing, and deleting) and modifying their properties (e.g. changing position, rotation, visibility and depth), to name but a few. In embodiments, this role comprises an animation role. In general terms, this refers to applying movement to objects. Content management role functions may therefore include one or more of the following:

Select or deselect objects.
Transform objects (e.g., translate, scale, rotate, flip).
Change the visibility of objects.
Change the depth position of objects.
Delete objects.
Group or separate objects.
Record and apply animation to objects.
Change the animation speed of objects.
Record and apply global animation.
Allocate an image to the content creation role to continue painting it.

General functions available to either of the roles may include one of more of the following:

Switch role.
Navigate the virtual workspace.
Join or exit a session.
Take a snapshot of the current view of the virtual workspace and share it online.
Change settings.
Save/load objects.

Although the division of functionality has been carefully chosen for improved user interaction, it is to be appreciated that the functions listed above are interchangeable and not necessarily limited to the particular roles under which they are listed.

IX. Content Creation Role

When this role is being supported, a user can create objects. For example, touches within the view area 2206 may be registered as paint "strokes". Thus, lines can be drawn by dragging a finger (or multiple fingers) within the view area 2206, and dots can be placed by tapping a finger (or multiple fingers) within the view area 2206.

Element 2227 visualizes the current brush settings. A brush preview is placed in its centre, reflecting brush properties such as hue, saturation, brightness, and transparency. Element 2230 presents a colour spectrum and allows the hue to be changed by dragging a finger left or right over the bar (or tapping on a desired point to select a desired hue).

The properties of the paint strokes can be manipulated in real-time in gesture area 2242. The various operations are designed so they can be performed without having to look once the user's hand is in place. The gesture area 2242 visualizes the range of tones within a hue (determined by brightness and saturation). For example, it is filled with a four-corner gradient: white in the top-left corner, full colour in the top-right corner, and black in the two lower corners. The gradient fill has the same transparency as the current brush. The gesture area 2242 also allows switching between roles and releasing images in progress. By way of example, exemplary touch inputs and corresponding functionality can include a one-finger horizontal drag to adjust the saturation, a one-finger vertical drag to adjust the brightness, a tap gesture to choose a specific tone, a two-finger pinch or spread to adjust the brush size, a two-finger horizontal drag to adjust the hue, a two-finger vertical drag to adjust the transparency, a three (or more)-finger tap to release an image in progress and a three (or more)-finger drag gesture to switch to a different role.

Erasing

When element 2228 is activated, all strokes in the view 2206 erase rather than paint. This is in accordance with brush size and transparency settings, while the hue, saturation and brightness settings have no effect. While the eraser function is active, the gesture area 2242 and the hue bar 2230 are shown without hue, saturation or brightness information—everything is set to a neutral grey. The brush preview 2227 shows a grey circle with the current size and transparency, and the gesture area 2242 shows the transparency.

Aiming

When element 2224 is activated, the touches in the view 2206 do not leave paint strokes. Instead, they are marked by touch cursors (in the view 2206 and on the external display) that show the current brush properties. These cursors help positioning strokes in the projection without leaving traces, and help to see how the chosen colour translates in the projection.

With touch input devices that support proximity detection, aiming can alternatively be activated automatically while the input instrument is close to the surface, but not yet touching.

Colour Picking

A colour from existing content shown in the view 2206 can be chosen by holding inside element 2227 and placing a single touch in the view 2206. Element 2227 updates to the colour exactly in the centre of the touch. In embodiments, when several touches are made in the view 2206, a median colour is calculated, i.e. colour mixing.

Depth Positioning

Objects within the virtual workspace may be positioned at different depths. That is to say that objects can appear in front, or behind, of other objects. In some embodiments, by default, new objects are created in front of existing objects. However, users may want to create objects behind existing objects. The graphical user interface therefore allows the user to select the depth position before creating a new image, for example by "sliding" a depth slider 2238 upwards or downwards. Objects positioned in front of a current depth position may be displayed as half transparent. A depth position may be retained as long as the user stays within the content creation role. When leaving and then returning to content creation role, the depth position may be reset to the top depth position.

Releasing Drawings for Animation

Releasing an in-progress image makes it available to be animated (either by the user or by other users of the session). A number of techniques may be used for releasing images with different workflow implications. First, an object can be released by switching to the management role. In order to release the current object for animation, the user may "grab" element 2244 and drag it to the left. This results in a change of user role. The same effect may be achieved by performing a horizontal swiping action in the gesture area 2242 with three or more fingers, for example. Second, an object can be released without leaving the content creation role. By tapping with three or more fingers in the gesture area 2242, the object currently in progress will be released without a switch to the management role. In this way, several objects can be released in rapid succession. When an object is released, this may be indicated to the user in the view 2206 by a visual effect that creates the illusion that the object is being "peeled off" the screen.

X. Content Management Role

When this role is being supported, a user can manage objects. The user may also apply animation to objects. In one embodiment, objects are managed based on object subsets. For example, operations such as selections, activations and transformations (e.g., translations and rotations) may be performed on objects that belong to one subset of objects, without affecting objects that belong to another subset of objects. Animation can be applied to objects when element 2233 is activated. While it remains activated, a sequence of transformations applied to one or more objects and defining an animation can be recorded. Further details of these aspects are given below.

Object States

The state of an object can be indicated using visual effects, such as colour coding. Some exemplary states are listed in the table below.

Objects can be selected (or deselected) by tapping on them in the artist view 2206. For example, several objects can be tapped simultaneously with multiple fingers in order to select all of them at once. Similarly, a selected object can be deselected by tapping on it. Selected objects become unavailable for selection by other users. Objects can be added to a selection by pressing and holding down on an already selected object, and then tapping on an available object.

Element 2236 shows the selection state of objects. Each selected object is represented by a circle, up to a set number (e.g. 5). The circles, i.e. the objects, can be grouped using a pinch gesture, and ungrouped using a spread gesture in the gesture area 2242. Elements 2232 and 2234 may provide functionality such as inserting objects stored on the device or directly obtained from the device camera.

When a stack of objects exists, tapping on the stack selects an object of the stack. Tapping on the stack again at the same location deselects the selected object and selects another object of the stack. In this way, it is possible to "cycle" through all objects in the stack until the desired one is selected.

Active objects are selected objects which are currently affected by a touch, i.e. they are designated as active objects. In other words, active objects can be manipulated and changed. Some of these are described in more detail below. In embodiments, functions provided by the management role affect only active objects; when there are no active objects, functions provided by the management role affect all of the selected objects.

Object Transformations

Selected objects can be moved, scaled and rotated by performing touch gestures in the view 2206. By way of example, a one- or two-finger drag gesture can be used to translate the object, a two-finger pinch/spread gesture can be used to scale the object, a two-finger rotation gesture can be used to rotate the object, a three-finger rotation gesture can be used to perform an isolated rotation of the object, a four- or five-finger gesture can be used to perform an isolated scale of the object, and touching the object with two fingers while moving a third finger over the object can be used to

| State | Colour | Properties |
|---|---|---|
| | | Primary states |
| Unavailable | Light grey | Not available for selection because the object is selected by another user |
| Available | Dark | Available for selection. Objects are differentiated from each other by a slight variation in hue within the "warm" section of the spectrum |
| Selected | Bright | Can be transformed and manipulated. Affected by management role controls as long as there is no active object. |
| Active | White | Currently affected by touches in the view (and potentially by the animation mode controls) |
| In progress | Pink | Not available for selection. Available for collaborative painting |
| | | Secondary states |
| Invisible | Pulsating visibility and colour of primary state | Objects with zero visibility are displayed with pulsating visibility in the artist view to enable the user to select and manipulate them |
| Recording in Progress | Red | Transformations of the object are currently being recorded |

It will be apparent that the aforementioned visual effects are merely examples, and that other visual effects can be used.

Selection and Activation of Objects flip the object (with the two fingers define the axis of the flip). The objects are set to active state for the duration of the transformation gestures. When one finger remains static during a rotate/scale gesture, the pivot of the transformation is the location of the static touch. If both touches are moving, the pivot will be the center point between the two touches.

A selected object can be directly transformed or manipulated by performing transformation or manipulation gestures on the graphical representation of the object. Using direct transformation or manipulation, two (or more) selected objects can be transformed or manipulated independently of each other by selecting them individually.

When performing transformation or manipulation gestures outside the graphical representation of selected objects, the transformation or manipulation is applied to all selected objects. Using such indirect transformation or manipulations, even very small objects can be transformed accurately.

When transformation gesture touches come close to the borders of the view 2206, the view 2206 moves into the direction of the border. The object(s) affected by the touch keep their relative position to the touch, which means they also translate into the direction of the border in absolute terms. This way, objects can be moved across the scene for long distances without the user having to keep adjusting the position of the view 2206.

Changing Parameters

The gesture area 2243 can be used to change the visibility, depth and animation speed of objects. When objects are made completely invisible with a vertical 2-finger drag gesture, they start flashing in the artist view so that they can still be found and manipulated. When objects have animation applied to them, the animation speed can be adjusted in the gesture area with a horizontal 2-finger drag.

Transformations can be applied as linear animation or recorded as an animation loop. If element 2233 is tapped briefly while transforming an object, the transformation will be continues in a linear fashion. The properties taken into account are transformations, visibility and depth. While element 2233 is activated, any animation on affected objects is recorded. It is applied as an animation loop on release. Recorded properties are transformations, visibility and depth. For animated compositions that stay intact over time, it is important to be able to create "closed" loops so that objects do not "wander off" over time. Therefore, in embodiments, when a loop recording is in progress, the start position of the object is visualized by a slightly faded dummy copy of the object. The dummy object is shown in full opacity when the animated object is close to its start position. When the animation button icon 2227 is released at this point, the path is adjusted so that the objects return exactly to the start position at each loop iteration. Otherwise, the object moves away along the recorded path. For visibility and depth, the values at the end position are blended over a certain period of time to match the values at the start position.

When the selection includes objects with animation loops, these objects are coloured in bright red for a brief "grace" period, e.g. 1 second, just before the end of the loop is reached. When a loop recording of another objects is started during this period (using direct animation), the start point of the new recording is matched to the other loop. When stopping the new recording within the grace period, the end points are matched to the other loop. This technique can be used to build up scenes where several objects with animation loops can run simultaneously while staying in sync with each other.

Global Operations

All available objects can be collectively selected, manipulated and animated. Global animation affects all newly released objects. When there are no objects selected, all available objects can be temporarily selected by holding in empty space in the view 2206 for a certain amount of time, e.g. one second. The scene background changes to a dark orange, while all available objects turn to selected state. When transformation gestures are performed in empty space, they affect all available objects (which change to active state for the duration of the transformations). When global transformations are recorded using the animation button icon 2233, the resulting animation persists in the scene: it will be automatically applied to all newly released images. Global animation is indicated by a dark red scene background. Individual objects can be taken out of global animation by tapping element 2233 while they are affected. Tapping the animation button again (without applying any transformations) reintegrates them into global animation.

Object Sets

Each object may belong to one of a plurality of subsets of objects. For example, content objects intended to be readily accessible may belong to a default subset, while content objects that are used for masks and backgrounds, as well as meta objects such as presentation space objects, may belong to another subset. Content objects can be transferred between subsets, while meta objects are automatically associated with a particular subset, and cannot be transferred to another subset. In embodiments, a user may access only one subset at a time. In this way, content objects used for masks and backgrounds are not accidentally modified or otherwise changed when a user is working with other content objects. As noted earlier, objects may be positioned within a range of depths (e.g. along a non-discrete depth axis) within the virtual workspace. Objects of at least one of the subsets may be above or below any other objects in the virtual workspace at minimum or maximum depths respectively. These objects may comprise the content objects used for masks (even in front of images currently in progress) and backgrounds. By way of example, in the context of a live visual performance, a content object may define a background landscape of a scene. This content object may therefore be positioned at the maximum depth of the virtual workspace as part of a subset that is not currently selected by a user who is creating or transforming other content objects within the scene.

Objects may be "tied" to a presentation space object, so that they keep their relative position to the presentation space object even when the presentation space object is moved or adjusted.

In order to switch between subsets, the user may tap an earmark icon 2240 in the view 2206, for example located in the upper right corner of the view 2206. If there is a selection of objects when initiating a switch, the selected objects are transferred from one subset to the other.

In embodiments, the presentation space object also becomes available for selection. A 'handle' graphic appears at the lower right side of the frame. By tapping the handle, the presentation space object can be selected like an object. The presentation space object can be scaled and moved using standard transformation gestures (but can't be rotated). The external display can be dimmed by adjusting the visibility of the frame. When the presentation space object is being indirectly transformed, "camera man mode" is activated: objects are shown in their real colors, and the area outside the frame is darkened. The user can focus on framing the content. Presentation space objects can be annotated with the user who "owns" the corresponding external display.

Other functionalities provided by the graphical user interface include loading or saving scenes, joining, exiting or locking (i.e. password-protecting) a session, taking a snapshot of the scene and sharing it online, and changing general settings.

Moreover, the graphical user interfaces described herein that may be used to perform the methods are provided by way of example only, and are not intended to be limiting. In other embodiments, the layouts of the interfaces, their relative shapes and sizes and types of graphical elements may vary.

Although foregoing embodiments provide for a paint mode and an animation mode, it is to be appreciated that functions of any of the above described modes may be interchanged or combined in any way, unless the features combined are evidently alternatives or mutually incompatible in another way. Furthermore, the modes other than paint and animation may be provided. For example, a mode for live animation of characters, backgrounds and effects, aimed at creating a believable world for an audience; a mode for real-time video performance artists to manipulate video from different sources (e.g. live stream, device camera, device video library) as objects, to add visual effects to objects and the presentation space object, to stream visual output of external software into an object in the virtual workspace, and to match animation speed to the rhythm detected in an audio channel.

Although foregoing embodiments are particularly advantageous for portable computing devices, it is to be appreciated that other types of computing devices can be used including desktop computers.

While embodiments of the invention have been illustrated and described, it is not intended that these embodiments illustrate and describe all possible forms of the invention. It will therefore be apparent to those skilled in the art that various modifications and variations can be made in the present invention without departing from the spirit or scope of the invention.

The invention claimed is:

1. A system for facilitating collaborative visual expression on a portable computing device, the system comprising:
   a working memory;
   a storage device; and
   a processor configured to execute instructions stored on at least one of the working memory and the storage device including instructions for
     constructing a virtual workspace at the portable computing device, the virtual workspace configured to host objects including one or more objects that define one or more subspaces of the virtual workspace;
     communicating with a cooperating portable computing device via a wireless communication link, once established between the portable computing device and the cooperating portable computing device, in order to synchronize the virtual workspace at the portable computing device with another virtual workspace constructed at the cooperating portable computing device;
     generating a graphical user interface, the graphical user interface configured to present an individual view of the virtual workspace to a user of the portable computing device and to allow visual expression within the virtual workspace via a touch input device associated with the portable computing device; and
     processing data pertaining to touch input detected by the touch input device in connection with the graphical user interface,
   wherein the graphical user interface module supports at least two user roles including a first user role for creating objects and a second user role for managing objects, and allows the user to switch between user roles by touch input, and
   wherein the first user role comprises a painting role and the second user role comprises an animation role.

2. A system according to claim 1, wherein the second user role enables the user to select one or more objects, which thereby become unavailable for selection by other users, and to designate at least one of the selected objects as an active object which can be transformed or manipulated.

3. A system according to claim 2, wherein the graphical user interface is further configured to enable the user to perform one or more of the following:
   to activate and subsequently transform or manipulate an available object independently of other objects when there are no selected objects, by touch input within an area defined by a graphical representation of said available object;
   to activate and subsequently transform or manipulate a selected object independently of other objects, by touch input within an area defined by a graphical representation of said selected object; and
   to collectively activate and subsequently transform or manipulate selected objects, by touch input outside of areas defined by the graphical representation or representations of the selected objects.

4. A system according to claim 1, wherein, when supporting the painting role, the graphical user interface is further configured to provide a first area in which the user can paint using touch input and to provide a second area in which the user can simultaneously change paint properties using another touch input.

5. A system according to claim 1, wherein, when supporting the animation role, the graphical user interface is further configured to enable recording of a sequence of transformations applied to an object using touch input, said sequence of transformations defining an animation loop.

6. A system according to claim 1, wherein objects can be positioned within a range of depths in the virtual workspace.

7. A system according to claim 1, wherein the graphical user interface is further configured to enable the user to adjust at least one of the one or more objects that define one or more subspaces of the virtual workspace by touch input, in order to compensate for perceived distortion caused by projection onto a surface that is not perpendicular to a projection axis, and to display a normal representation of said at least one of the one or more objects that define one or more subspaces of the virtual workspace to the user, and wherein the processor is further configured, in processing data pertaining to touch imput, to map touch inputs from the normal representation to the corresponding adjusted object.

8. A system according to claim 7, wherein the processor is further configured, in processing data pertaining to touch input, to identify a first touch input as a selection of an edge or corner of said at least one of the one or more objects that define one or more subspaces of the virtual workspace, to identify a second touch input as an adjusted position of the selected edge or corner, and to adjust said at least one of the one or more objects that define one or more subspaces of the virtual workspace in accordance with the touch inputs.

9. A system according to claim 1, wherein the virtual workspace comprises a plurality of objects defining a plurality of subspaces of the virtual workspace at least two of which can be joined together to form an enlarged object that defines an enlarged subspace of the virtual workspace.

10. A system according to claim 1, wherein the graphical user interface is further configured to apply visual effects to objects in order to indicate different states of the objects.

11. A system according to claim 10, wherein the visual effects indicate one or more of: that an object has been selected by the user of the portable computing device or another user, that an object has been designated as an active object which can be transformed or manipulated, that an object is available for selection, that an object is unavailable for selection, and that an object belongs to one of two or more user selectable subsets of objects other than the one currently selected by the user.

12. A computer-implemented method for collaborative visual expression, the method comprising:
constructing a virtual workspace at the portable computing device, the virtual workspace configured to host objects including one or more objects that define one or more subspaces of the virtual workspace;
communicating with a cooperating portable computing device via a wireless communication link, once established between the portable computing device and the cooperating portable computing device, in order to synchronize the virtual workspace at the portable computing device with another virtual workspace constructed at the cooperating portable computing device;
generating a graphical user interface, the graphical user interface configured to present an individual view of the virtual workspace to a user of the portable computing device and allowing visual expression within the virtual workspace via a touch input device associated with the portable computing device;
providing support for at least two user roles including a first user role for creating objects and a second user role for managing objects, wherein the first user role comprises a painting role and the second user role comprises an animation role; and
processing data pertaining to touch input detected by the touch input device in connection with the graphical user interface.

13. A method according to claim 12, further comprising, while supporting the second user role:
receiving data pertaining to touch input indicating selection of one or more objects;
preventing selection of said one or more objects by other users; and
receiving data pertaining to touch input indicating designation of at least one of the selected objects as an active object which can be transformed or manipulated.

14. A method according to claim 13, further comprising one or more of:
activating and subsequently transforming or manipulating an available object independently of other objects when there are no selected objects, in response to touch input within an area defined by a graphical representation of said available object;
activating and subsequently transforming or manipulating a selected object independently of other objects, in response to touch input within an area defined by a graphical representation of said selected object; and
collectively activating and subsequently transforming or manipulating selected objects, in response to touch input outside of areas defined by the graphical representation or representations of the selected objects.

15. A method according to claim 12, further comprising, when supporting the painting role:
receiving data pertaining to touch input representing a paint stroke in a first area of the graphical user interface; and
receiving data pertaining to touch input indicating a paint property change in a second area of the graphical user interface, the touch inputs being simultaneous.

16. A method according to claim 12, further comprising, when supporting the animation role:
recording a sequence of transformations applied to an object using touch input, said sequence of transformations defining an animation loop.

17. A method according to claim 12, further comprising:
hosting objects within a range of depths in the virtual workspace.

18. A method according to claim 12, further comprising:
adjusting at least one of the one or more objects that define one or more subspaces of the virtual workspace in response to touch input;
displaying a normal representation of said at least one of the one or more objects that define one or more subspaces of the virtual workspace to the user; and
mapping touch inputs from the normal representation to the corresponding adjusted object.

19. A method according to claim 17, wherein said adjusting comprises:
interpreting data pertaining to touch input as a selection of an edge or corner of said at least one of the one or more objects that define one or more subspaces of the virtual workspace; and
interpreting data pertaining to subsequent touch input as an adjusted position of the selected edge or corner.

20. A method according to claim 18, further comprising:
joining together a plurality of objects that define a plurality of subspaces of the virtual workspace to form an enlarged object that defines an enlarged subspace of the virtual workspace.

21. A method according to claim 12, further comprising:
applying visual effects to objects in order to indicate different states of the objects.

22. A method according to claim 21, further comprising at least one of: applying a first visual effect indicating that an object has been selected by the user or another user of the portable computing device or another user, applying a second visual effect indicating that an object has been designated as an active object which can be transformed or manipulated, applying a third visual effect indicating that an object is available for selection, applying a fourth visual effect indicating that an object is unavailable for selection, and applying a fifth visual effect indicating that an object belongs to one of two or more user selectable subsets of objects other than the one currently selected by the user.

23. A portable computing device including the system of claim 1.

24. A system according to claim 1, wherein the processor is further configured to output data pertaining to a current visual appearance of one or more content objects that a least partially overlap with at least one of the one or more objects that define one or more subspaces of the virtual workspace, to enable displaying of at least part of the content object or objects in a vicinity of the portable computing device.

25. A method according to claim 12, further comprising outputting data pertaining to a current visual appearance of one or more content objects that a least partially overlap with at least one of the objects that define one or more subspaces of the virtual workspace, to enable displaying of at least part of the object or objects in a vicinity of the portable computing device.

26. A non-transitory computer-readable medium storing computer readable instructions which, when executed by a computer, cause the computer to perform a method for collaborative visual expression, the method comprising:

constructing a virtual workspace at the portable computing device, the virtual workspace configured to host objects including one or more objects that define one or more subspaces of the virtual workspace;

communicating with a cooperating portable computing device via a wireless communications link, one established between the portable computing device and the cooperating portable computing device, in order to synchronize the virtual workspace at the portable computing device with another virtual workspace constructed at the cooperating portable computing device;

generating a graphical user interface, the graphical user interface configured to present an individual view of the virtual workspace to a user of the portable computing device and allowing visual expression within the virtual workspace via a touch input device associated with the portable computing device;

providing support for at least two user roles including a first user role for creating objects and a second user role for managing objects, wherein the first user role comprises a painting role and the second user role comprises an animation role; and processing data pertaining to touch input detected by the touch input device in connection with the graphical user interface.

* * * * *